United States Patent
Tan et al.

(10) Patent No.: US 12,263,956 B2
(45) Date of Patent: Apr. 1, 2025

(54) SITUATIONAL AWARENESS MONITORING SYSTEMS AND METHODS

(71) Applicants: Airbus Americas, Inc., Mobile, AL (US); Airbus Operations GmbH, Hamburg (DE)

(72) Inventors: Joyce S. T. Tan, Mobile, AL (US); Tina Kay Griffin, Mobile, AL (US); Patrick Alexander Rollfink, Hamburg (DE); Christophe J. P. J. Legare, Ottawa (CA); Natalia Cooper, Ottawa (CA); John Russell Thomas, Ottawa (CA); Shelley M. Roberts, Ottawa (CA); Caidence S. Paleske, Ottawa (CA)

(73) Assignees: Airbus Americas, Inc., Mobile, AL (US); Airbus Operations GmbH, Hamburg (DE); National Research Council of Canada, Ontario (CA)

( * ) Notice: Subject to any disclaimer, the term of this patent is extended or adjusted under 35 U.S.C. 154(b) by 195 days.

(21) Appl. No.: 18/069,343

(22) Filed: Dec. 21, 2022

(65) Prior Publication Data

US 2024/0208668 A1 Jun. 27, 2024

(51) Int. Cl.
*B64D 45/00* (2006.01)
*B64D 11/00* (2006.01)
*G06T 11/00* (2006.01)

(52) U.S. Cl.
CPC .......... *B64D 45/00* (2013.01); *B64D 11/0015* (2013.01); *G06T 11/00* (2013.01)

(58) Field of Classification Search
None
See application file for complete search history.

(56) References Cited

U.S. PATENT DOCUMENTS

| 5,826,824 A | 10/1998 | Martin et al. |
| 6,972,694 B2 * | 12/2005 | Carroll ............... B64D 45/0059 340/963 |
| 7,198,228 B2 | 4/2007 | Mills et al. |

(Continued)

FOREIGN PATENT DOCUMENTS

EP 4134298 A1 2/2023

OTHER PUBLICATIONS

European Search Report for Application No. 232188284 dated Apr. 2, 2024.

*Primary Examiner* — K. Wong
(74) *Attorney, Agent, or Firm* — KDW Firm PLLC

(57) ABSTRACT

An aircraft with an aircraft fuselage, and a passenger cabin and a cockpit, where the aircraft includes a center-forward attendant space between the passenger cabin and the cockpit. A cabin crew member of the aircraft can stand in the center-forward attendant space for monitoring progress of an emergency evacuation of the aircraft. The aircraft has one or more emergency exits for providing egress of passengers from the aircraft fuselage during the emergency evacuation. The aircraft also has a situational awareness monitoring (SAM) system for use in evacuating the passengers from the aircraft during the emergency evacuation. The SAM system includes one or more imaging devices and one or more display modules, each of which displays within the passenger cabin images captured by a corresponding one of the one or more imaging devices.

21 Claims, 22 Drawing Sheets

(56) References Cited

U.S. PATENT DOCUMENTS

| | | |
|---|---|---|
| 7,787,913 B2 | 8/2010 | Cornell |
| 9,173,044 B2 | 10/2015 | Coto-Lopez |
| 9,292,736 B2 * | 3/2016 | Srinivasan ............ G06V 40/103 |
| 9,327,833 B2 | 5/2016 | Ehlers et al. |
| 9,340,294 B1 | 5/2016 | Keleher et al. |
| 9,640,000 B2 | 5/2017 | Koch |
| 10,259,582 B2 | 4/2019 | Chen et al. |
| 10,351,251 B2 | 7/2019 | Haynes et al. |
| 10,711,487 B2 * | 7/2020 | Ward ..................... E05B 41/00 |
| 10,723,481 B2 * | 7/2020 | Gerard ............... B64D 45/0059 |
| 10,911,685 B2 | 2/2021 | Jang |
| 10,962,205 B2 | 3/2021 | Bagozzi et al. |
| 11,440,676 B2 * | 9/2022 | Olson .................. H04B 7/1851 |
| 11,649,067 B2 * | 5/2023 | Hunt ......................... B64F 5/60 |
| | | 382/103 |
| 2016/0090196 A1 | 3/2016 | Besettes |
| 2016/0224843 A1 * | 8/2016 | Boigas ................... B64D 11/00 |
| 2022/0021999 A1 | 1/2022 | Yamkovoy et al. |

* cited by examiner

SITUATIONAL AWARENESS MONITORING SYSTEMS AND METHODS

TECHNICAL FIELD

The disclosure herein relates to systems for monitoring an operational environment of an aircraft, in particular, for directing and monitoring passenger and crew egress from an aircraft during the occurrence of an event requiring rapid disembarkation from the aircraft. Moreover, the disclosure herein relates to systems and methods for directing and monitoring passenger and crew egress from an aircraft during the occurrence of such an event.

BACKGROUND

While every effort is made to avoid it, an emergency cabin evacuation is an inevitable event at some point during the operational lifetime of an aircraft. During the occurrence of such an event, maintaining communication amongst cabin crew members and with passengers is of utmost importance in ensuring that all occupants of the aircraft can safely be evacuated. As such, a need exists for improved systems and methods for carrying out and managing evacuations of an aircraft with maximum safety and efficacy.

SUMMARY

According to an example embodiment disclosed herein, an aircraft is provided, the aircraft comprising an aircraft fuselage having a passenger cabin and a cockpit, a center-forward attendant space located between the passenger cabin and the cockpit and configured for a cabin crew member of the aircraft to stand therein and monitor progress of an emergency evacuation of the aircraft, one or more emergency exits for providing egress of passengers from the aircraft fuselage during the emergency evacuation, and a situational awareness monitoring (SAM) system for use in evacuating the passengers from the aircraft during the emergency evacuation, the SAM system comprising one or more imaging devices, and one or more display modules, each of which is configured to display within the passenger cabin images captured by a corresponding one of the one or more imaging devices.

In some embodiments of the aircraft, the one or more emergency exits comprise a plurality of emergency exit doors at a front and/or rear of the aircraft fuselage and/or a plurality of overwing emergency exits provided within the passenger cabin, in an overwing position.

In some embodiments of the aircraft, the SAM system comprises, for each of the plurality of overwing emergency exits or for pairs of immediately adjacent overwing emergency exits, an incremental counter configured to detect egress of a person from the passenger cabin through the overwing emergency exit or the pair of immediately adjacent overwing emergency exits associated with the incremental counter, and/or each of the display modules is provided at a corresponding one of the plurality of emergency exit doors and comprises an incremental counter configured to detect egress of a person from the aircraft fuselage through the corresponding one of the plurality of emergency exit doors.

In some embodiments of the aircraft, the SAM system is configured to display in realtime, from a passenger count of each of the incremental counters, a quantity of passengers remaining on the aircraft on each of the display modules.

In some embodiments of the aircraft, the SAM system is configured to receive, at one of the plurality of display modules, an initial passenger count onboard the aircraft from one of the cabin crew members and to calculate the quantity of passengers remaining onboard the aircraft by subtracting the passenger count received from each of the incremental counters from the initial passenger count.

In some embodiments of the aircraft, each of the plurality of display modules comprises a touchscreen, on which inputs can be received via direct contact with a display screen thereof.

In some embodiments of the aircraft, the one or more imaging devices comprise a plurality of imaging devices, each of the plurality of imaging devices being installed at a corresponding one of the plurality of emergency exit doors and oriented such that the images captured by each of the plurality of imaging devices are of an external environment outside of the corresponding one of the plurality of emergency exit doors, and the one or more display modules comprise a plurality of display modules, each of the plurality of display modules being installed at a corresponding one of the plurality of emergency exit doors and configured such that the images displayed thereon are received from one of the plurality of imaging devices installed at a same one of the plurality of emergency exit doors, so that cabin crew members can determine which of the plurality of emergency exit doors is safe to use for egress of passengers from the aircraft during the emergency evacuation of the aircraft before opening of the emergency exit door associated therewith.

In some embodiments of the aircraft, the incremental counters at the overwing emergency exits are configured for wireless data transmission of the passenger count associated therewith to each of the plurality of display modules.

In some embodiments of the aircraft, the SAM system comprises, at each of the plurality of emergency exit doors, a physical obstruction configured to be deployed to block egress of passengers through the emergency exit door across which such physical obstruction is deployed when a determination has been made that continued use of the emergency exit door for egress of passengers from the aircraft is no longer safe.

In some embodiments, the aircraft comprises an onboard power source connected to the SAM system and configured to supply power to the SAM system during normal operation, wherein the SAM system comprises a battery backup power system configured to provide power for continued operation of the SAM system upon interruption of power from the onboard power supply.

According to another example embodiment, a method of monitoring an emergency evacuation of an aircraft comprises providing an aircraft fuselage having a passenger cabin and a cockpit, providing a center-forward attendant space located between the passenger cabin and the cockpit, installing a situational awareness monitoring (SAM) system for use in evacuating the passengers from the aircraft during the emergency evacuation, the SAM system comprising one or more imaging devices, and one or more display modules, positioning a cabin crew member of the aircraft to stand at the center-forward attendant space for monitoring progress of the emergency evacuation, transmitting images captured by the one or more imaging devices to a corresponding one of the one or more display modules, and displaying within the passenger cabin the images captured by a corresponding one of the one or more imaging devices on the corresponding one of the one or more display modules.

In some embodiments of the method, the one or more emergency exits comprise a plurality of emergency exit doors at a front and/or rear of the aircraft fuselage and/or a plurality of overwing emergency exits provided within the passenger cabin, in an overwing position.

In some embodiments of the method, the SAM system comprises, for each of the plurality of overwing emergency exits or for pairs of immediately adjacent overwing emergency exits, an incremental counter, and the method comprising detecting egress of a person from the passenger cabin through the overwing emergency exit or the pair of immediately adjacent overwing emergency exits associated with the incremental counter, and/or wherein each of the display modules is provided at a corresponding one of the plurality of emergency exit doors and comprises an incremental counter, and the method comprising detecting, using the incremental counter of the display modules, egress of a person from the aircraft fuselage through the corresponding one of the plurality of emergency exit doors.

In some embodiments, the method comprises displaying in realtime, from a passenger count of each of the incremental counters, a quantity of passengers remaining on the aircraft on each of the display modules.

In some embodiments, the method comprises receiving, at one of the plurality of display modules, an initial passenger count onboard the aircraft from one of the cabin crew members, and calculating the quantity of passengers remaining onboard the aircraft by subtracting the passenger count received from each of the incremental counters from the initial passenger count.

In some embodiments of the method, each of the plurality of display modules comprises a touchscreen, on which inputs can be received via direct contact with a display screen thereof.

In some embodiments of the method, the one or more imaging devices comprise a plurality of imaging devices, each of the plurality of imaging devices being installed at a corresponding one of the plurality of emergency exit doors and oriented such that the images captured by each of the plurality of imaging devices are of an external environment outside of the corresponding one of the plurality of emergency exit doors; and the one or more display modules comprise a plurality of display modules, each of the plurality of display modules being installed at a corresponding one of the plurality of emergency exit doors and displaying the images received from one of the plurality of imaging devices installed at a same one of the plurality of emergency exit doors, so that cabin crew members can determine which of the plurality of emergency exit doors is safe to use for egress of passengers from the aircraft during the emergency evacuation of the aircraft before opening of the emergency exit door associated therewith.

In some embodiments, the method comprises transmitting data of the passenger count associated therewith wirelessly from the incremental counters at the overwing emergency exits to each of the plurality of display modules.

In some embodiments of the method, the SAM system comprises, at each of the plurality of emergency exit doors, a physical obstruction, the method comprising deploying the physical obstruction to block egress of passengers through the emergency exit door across which such physical obstruction is deployed when a determination has been made that continued use of the emergency exit door for egress of passengers from the aircraft is no longer safe.

In some embodiments, the method comprises connecting an onboard power source to the SAM system and supplying power to the SAM system during normal operation, providing the SAM system with a battery backup power system, and providing power for continued operation of the SAM system upon interruption of power from the onboard power supply.

Further features, properties, advantages and possible derivations will be evident to the person skilled in the art from the description below which refers to the attached, example drawings. All features described and/or depicted in the drawings, alone or in arbitrary combinations, indicate the object disclosed herein. The dimensions and proportions of the components shown in the figures are not to scale.

BRIEF DESCRIPTION OF THE DRAWINGS

The disclosure herein will be explained in more detail with reference to figures. The example figures referenced below illustrate schematically.

DETAILED DESCRIPTION

In the description below, without being restricted hereto, specific details are presented in order to give a complete understanding of the disclosure herein. It is, however, clear to a person skilled in the art that the disclosure herein may be used in other example embodiments which may differ from the details outlined below. The figures serve furthermore merely to illustrate example embodiments, are not to scale, and serve merely to illustrate by example the general concept of the disclosure herein. For example, features contained in the figures must not necessarily be considered to be essential components.

Comparable or identical components and features, or those with similar effect, carry the same reference signs in the figures. For reasons of clarity, in the figures sometimes the reference signs of individual features and components have been omitted, wherein these features and components carry reference signs in the other figures.

Figure 1:
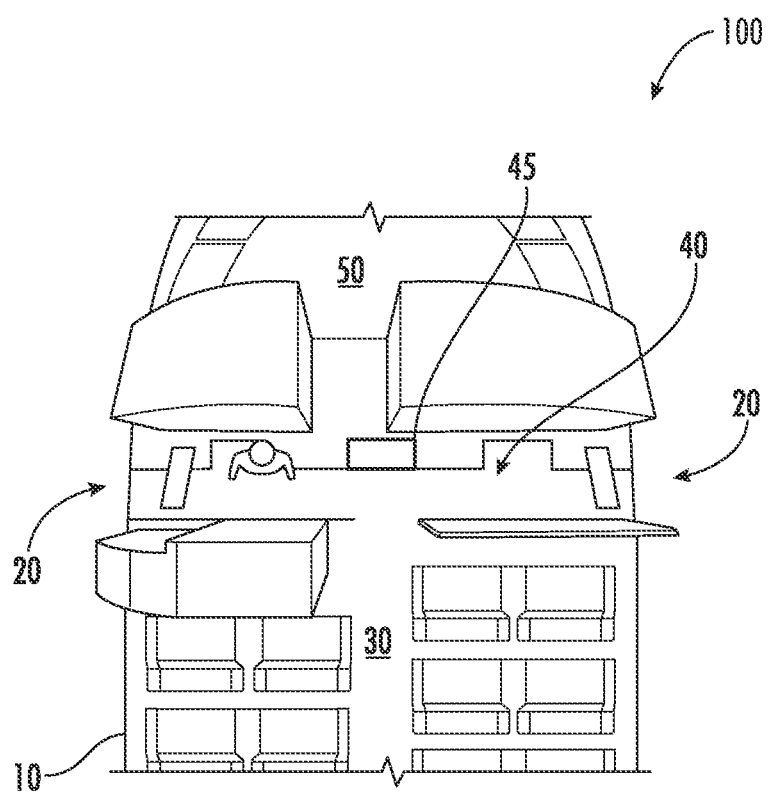
FIG. 1 is a top view of a forward portion of a passenger cabin within an aircraft.

FIG. 1 is a top view of a forward portion, generally designated 40, between a passenger cabin 30 and a cockpit 50 within an aircraft 10, in which an improved situational awareness monitoring (SAM) system, generally designated 100 (see FIG. 11), is installed. The SAM system 100 is configured to improve both the situational awareness of cabin crew members 1 and also of the communication between and amongst cabin crew members 1 during an emergency evacuation event. While the SAM system 100 is disclosed herein in an example embodiment being installed on an Airbus A320 aircraft in FIG. 11, the use of such a SAM system 100 is not limited to only this aircraft or even to only aircraft manufactured by Airbus but can in fact be adapted for installation in any suitable aircraft desired, including commercial aircraft.

There are many factors that impact the actions of cabin crew members 1, whether during an emergency situation or otherwise. Examples of such factors can include informational influences (e.g., not being privy to one or more pieces of information), environmental influences (e.g., the presence of smoke in the aircraft cabin), organizational influences (e.g., the frequency of cabin crew training), and personal influences (e.g. the level of physical fitness or stature of the cabin crew member). Each of these influences can impact the actions performed by a cabin crew member 1 while on-duty.

In the example embodiment disclosed herein, the SAM system 100 comprises an evacuation indicator, a passenger address system, a display module 300, a imaging device 200, an incremental counter 500, one or more power sources 600, a dedicated center-forward attendant space 45, a deployable door obstruction 400, and, optionally, headsets worn by cabin crew during an emergency evacuation event. The SAM system 100 disclosed herein can advantageously be installed in both new aircraft during assembly (e.g., linefit) and in existing aircraft (e.g., during a retrofit). The SAM system 100 is designed so that cabin evacuation can be performed without an increase in the workload of the cabin crew and without decreasing the safety of cabin crew and passengers. Furthermore, the SAM system 100 disclosed herein has an Equivalent Level of Safety (ELoS)) that is the same as or greater than existing emergency cabin evacuation systems and procedures.

The SAM system 100 is configured to activate (e.g., via illumination) the evacuation indicator upon receipt of an evacuation signal. The evacuation indicator is positioned where it is readily visible to cabin crew members to alert cabin crew members to begin evacuation of the aircraft. The SAM system 100 is also configured, upon activation of the evacuation indicator, to play through speakers of the aircraft pre-recorded auditory-based messages containing instructions for the passengers and/or the cabin crew members to perform during evacuation; in some embodiments, the speakers are part of a passenger address system of the aircraft, by which the crew of the aircraft can communicate with the passengers of the aircraft simultaneously. An example of a pre-recorded auditory-based message is to "release seat belts and go to the exit doors." Other messages are within the scope of the subject matter disclosed herein.

Figure 2:
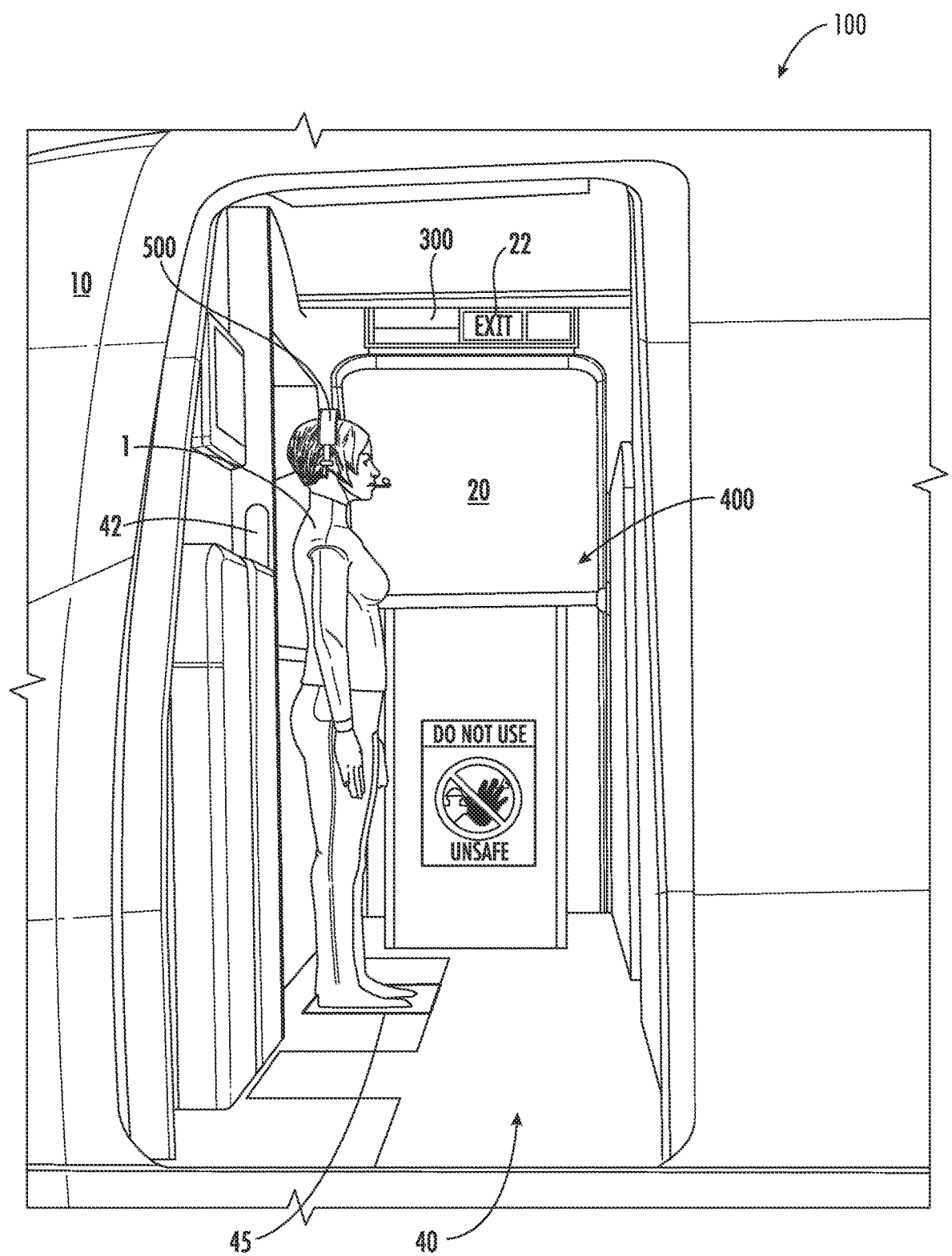
FIG. 2 is a side perspective view of an attendant space within the forward portion of the passenger cabin shown in FIG. 1.
Figure 3:
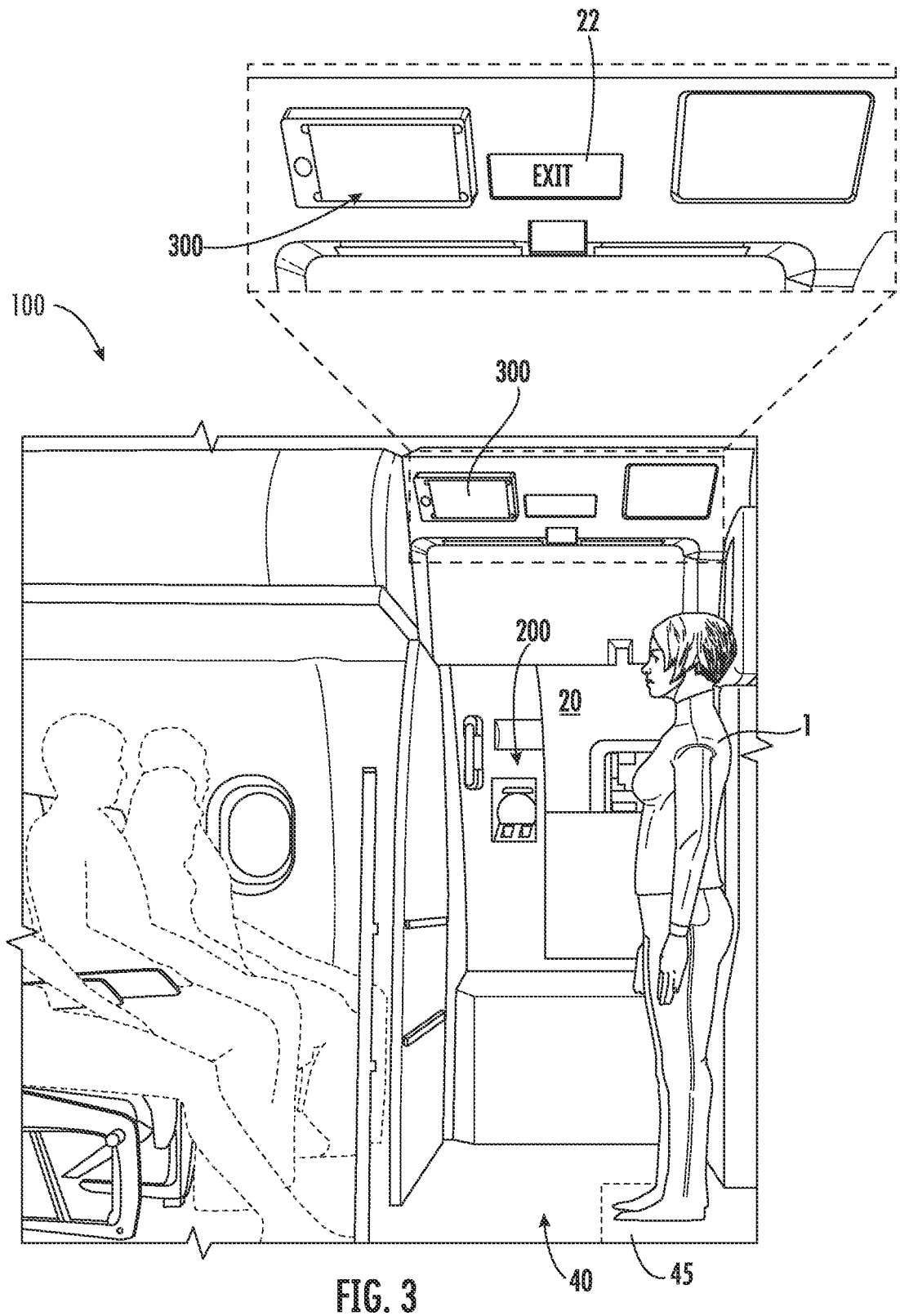
FIG. 3 is a side perspective view of a forward portion of a passenger cabin within an aircraft.
Figure 4A:
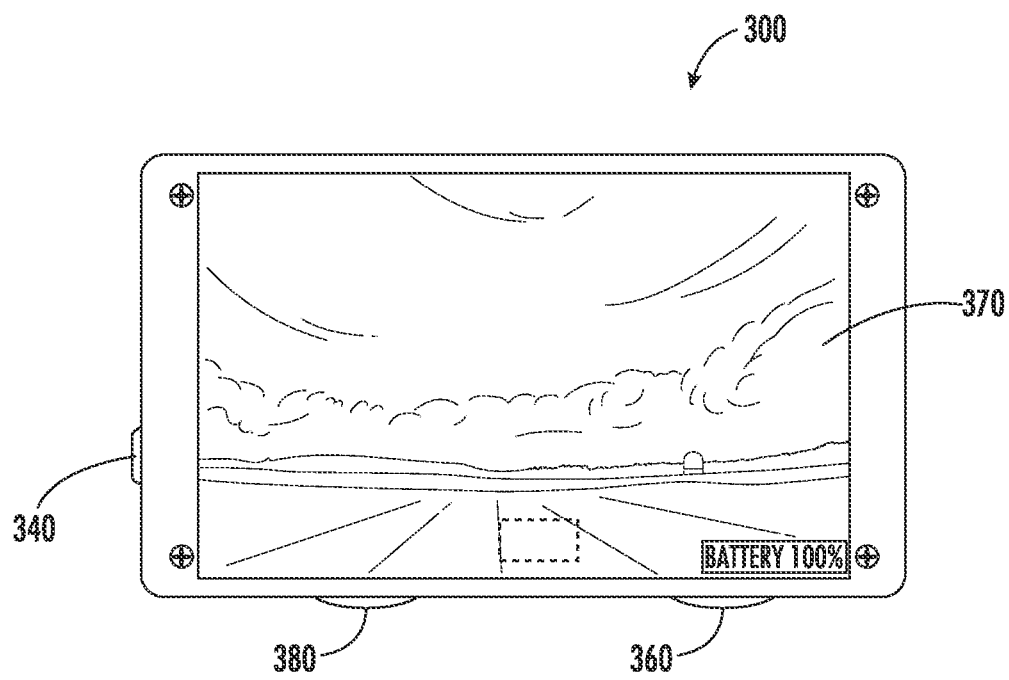
FIGS. 4A and 4B are example illustrations of graphical data that can be presented to cabin crew members using the display screens of the system disclosed herein.
Figure 4B:
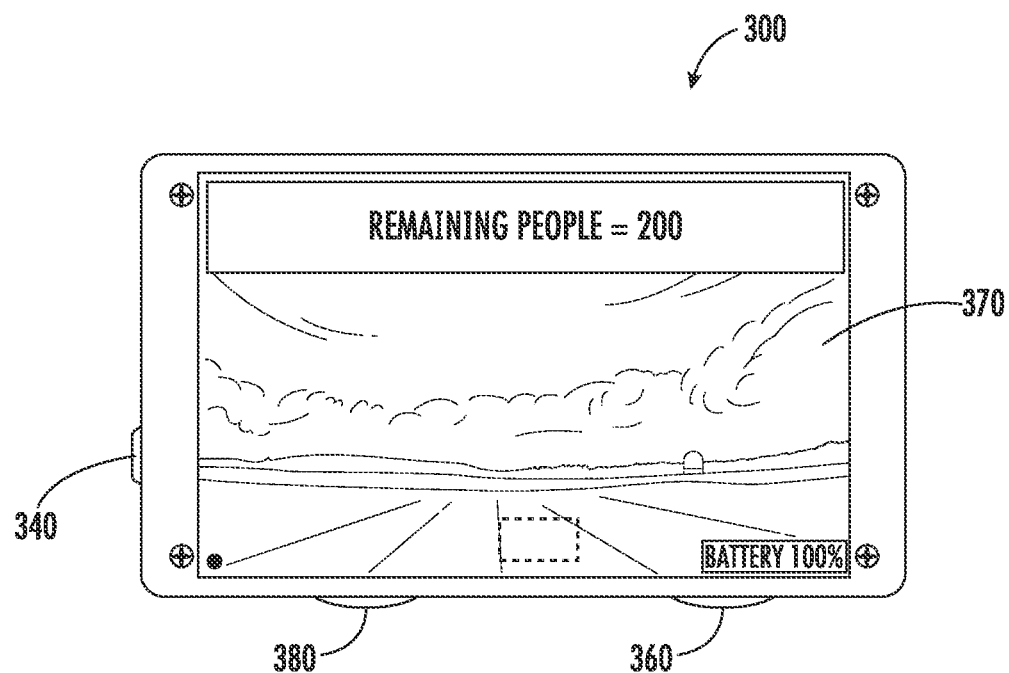

As shown in FIG. 1, a forward area of a passenger cabin of an aircraft is shown, immediately adjacent to the cockpit of the aircraft and between the bulkheads delimiting the cockpit and the bulkheads delimiting the passenger cabin area. The SAM system 100 comprises, as shown in FIGS. 1 and 2, a center-forward attendant space where a member of the cabin crew can stand during an emergency evacuation event. A handle 42 is formed in one or both of the bulkheads delimiting the passenger cabin and/or the cockpit for grasping by the cabin crew member standing in the center-forward attendant space.

The center-forward attendant space allows the cabin crew to monitor exit doors while urging and guiding passengers to the emergency exits. If one or both of the forward emergency exits are or become unsafe during evacuation, the attendant can block access to these doors while standing in the center-forward attendant space using the provided handhold. From this position, the forward cabin crew member can manage passenger flow more efficiently with an early review of passenger activity in the cabin. The forward cabin crew member is also positioned to ensure passengers are not bringing luggage or other items to the exit, which would slow the evacuation process. Also, from the center-forward attendant space, the forward cabin crew member has the ability to view and direct passengers to other emergency exits upon the forward cabin crew member noticing that there are emergency exits that are being underutilized.

As shown in FIGS. 2-5, the SAM system 100 comprises a display module, generally designated 300, positioned adjacent to (e.g., above) a doorway provided for egress of passengers and crew of the aircraft during an emergency evacuation event. In some embodiments, the display modules 300 can be provided immediately adjacent to illuminated "EXIT" signs 22 provided above each such doorway of an emergency exit door, generally designated 20. The display modules 300 comprise a screen 370 (e.g., a touchscreen, by which a user can interact with the display module 300 by touching directly on the screen portion thereof), a speaker 380 (e.g., a directional speaker), an incremental counter 360, a power source 336 (e.g., batteries), and a microprocessor 320. All of the components of each of the display modules 300 is contained within, or rigidly attached to, a housing 310.

During normal operation of the aircraft, the SAM system 100 is initialized at the beginning of each flight and one of the cabin crew members 1 inputs a total passenger, or occupant (e.g., including crew members), count through the display module 300 (e.g., in the manner of a touchscreen). When powered on, the display module 300 is configured to display on the screen 370 thereof a view of the outside environment at the emergency exit door 20 at which the display module 300 is installed. This view of the outside environment is provided from a corresponding one of the imaging devices 200 installed adjacent to the display module 300. During flight, the display modules 300 are powered by a power source (see, e.g., 600, FIG. 12) of the aircraft 10. The status of the SAM system 100 is displayed on all of the display modules 300. After the flight has ended, one of the cabin crew members 1 powers off the display modules 300 to avoid system battery drain and also to erase or reset the passenger count of the preceding flight, so that a new passenger count can be input for a next flight as appropriate.

Furthermore, if an emergency is declared during flight, the cabin crew member 1 seated near the display module 300 can view the outside environment of the emergency exit door 20, allowing the cabin crew member 1 to determine which of the emergency exit doors 20 are safe to open and use for evacuation of the occupants of the aircraft 10. Upon the cabin crew member 1 determining that an emergency exit door 20 is safe to open, the cabin crew member 1 can activate the passenger address system through the touchscreen 370 of the display module 300 to initiate the pre-programmed audio messages to be broadcast to the passengers. Furthermore, upon initiation of the pre-programmed audio messages, the passenger address system can furthermore, in conjunction with the incremental counters 500 and/or the controller, announce the quantity of passengers still remaining on the aircraft 10 at prescribed intervals (e.g., every 5 or 10 persons) as they exit the aircraft 10. The remaining passenger count is advantageously always displayed on the screen 370 of each of the display modules 300. Additionally, if a particular emergency exit door 20 becomes unsafe for continued use during evacuation of the aircraft 10, the display module 300 associated with this unsafe emergency exit door 20 may be turned off by the cabin crew member 1 via the touchscreen 370 of the display module 300.

Still referring to the display module 300 shown in FIGS. 2-5, the display module 300 comprises a display screen 370 for viewing an outside environment and surroundings of the aircraft 10 at the emergency exit door 20 where the display module 300 is installed. The display module 300 is further configured to play audio messages directed at passengers exiting through the emergency exit associated with the display module 300. The display modules 300 further comprise a counting sensor 360 that is integrated into each of the display modules 300 that are provided at emergency exit doors 20 (e.g., not at the overwing emergency exits 60). The counting sensor 360 of the display module 300 is operable substantially similarly to the incremental counters 500 shown and described with respect to FIGS. 6 and 7 and comprises a sensor configured to detect movement of individual persons within the field of view of the sensor.

The display module 300 further comprises a voltage converter 338 to convert aircraft line voltage to an operating voltage (e.g., 5V) of the display module 300 components, as well as a voltage converter 332 to convert aircraft line voltage to a voltage suitable for use by a battery charger 334 provided in the display module 300. The battery charger 334 is connected to a battery 336 (e.g., NiMH), which feeds to the voltage converter 338 to convert the battery voltage to the operating voltage (e.g., 5V) of the display module 300 components. The display module 300 further comprises a wireless communications antenna 350 for communication with, for example, the incremental counters 500 and/or the other display modules 300. In some embodiments, the antenna 350 is a network mesh antenna. The display module 300 is configured to display on the screen 370 any error messages for system faults and/or battery charge conditions. The display screen 370 of the display module 300 is advantageously a touchscreen to allow for cabin crew members 1 to input a passenger count of those who are onboard the aircraft 10 for take-off and also for activating the audio messages. The display module 300 further comprises a switch 340 that is configured to toggle the display module 300 between an "on" state and an "off" state.

Thus, the display modules 300 are supplied with 28 VDC aircraft power from a power connector 330 for normal operation and have NiMH battery backup 336 to maintain operation for at least 10 minutes upon failure to receive aircraft power. The display module 300 further comprises a microprocessor 320 configured to operate and monitor the display module 300 and the SAM system 100 as a whole. The display modules 300 are integrated into the upper door surround area of an emergency exit door 20 (e.g., an aircraft door), with a wired connection to aircraft power and also to an associated one of the imaging devices 200. Communication between the display modules 300 and the incremental counters 500 can be wired, wireless, or wired and wireless to provide redundant operation.

Figure 6:
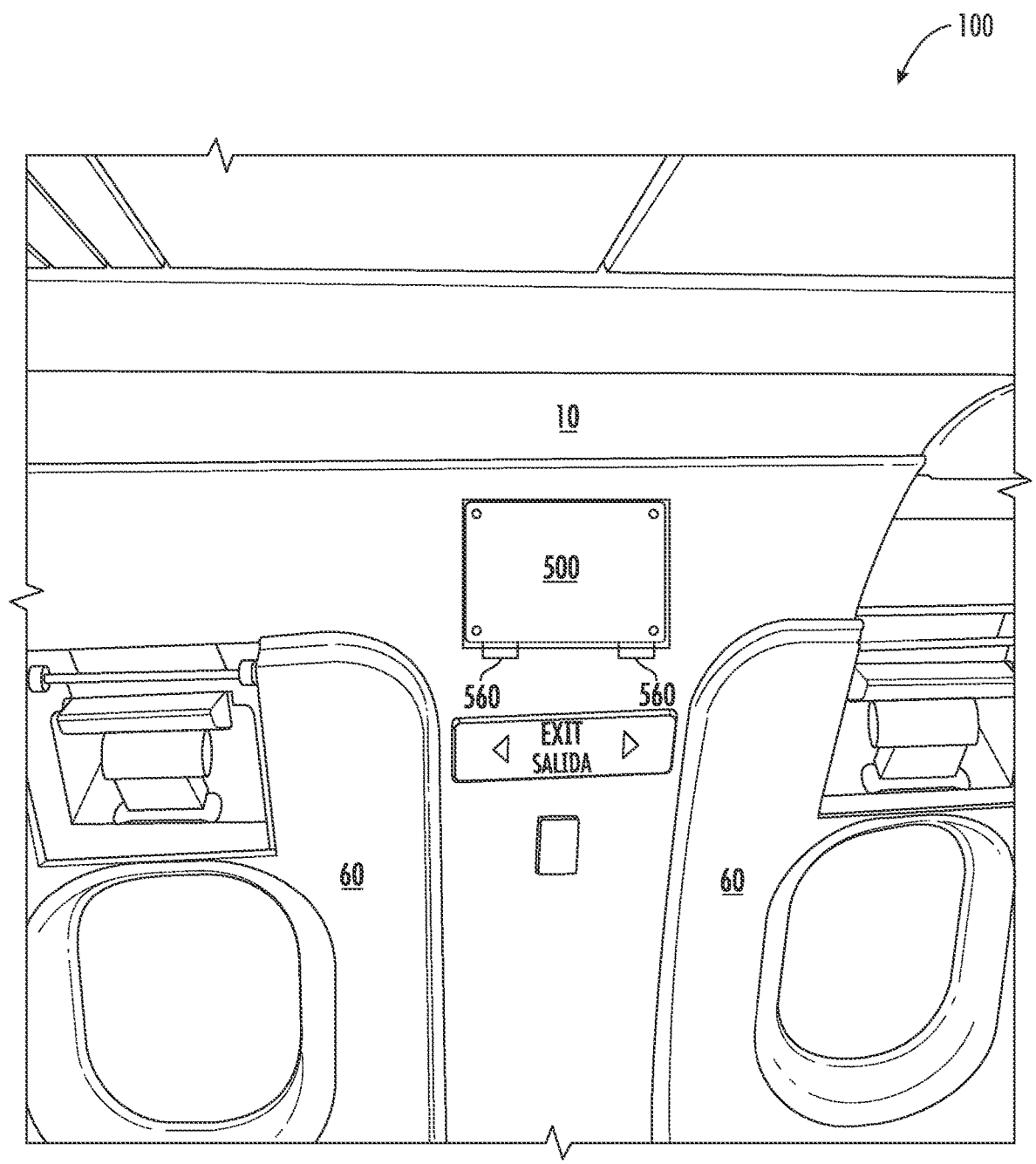
FIG. 6 is a perspective view of emergency exits of an aircraft with an incremental counter arranged adjacent to the emergency exits.
Figure 7:
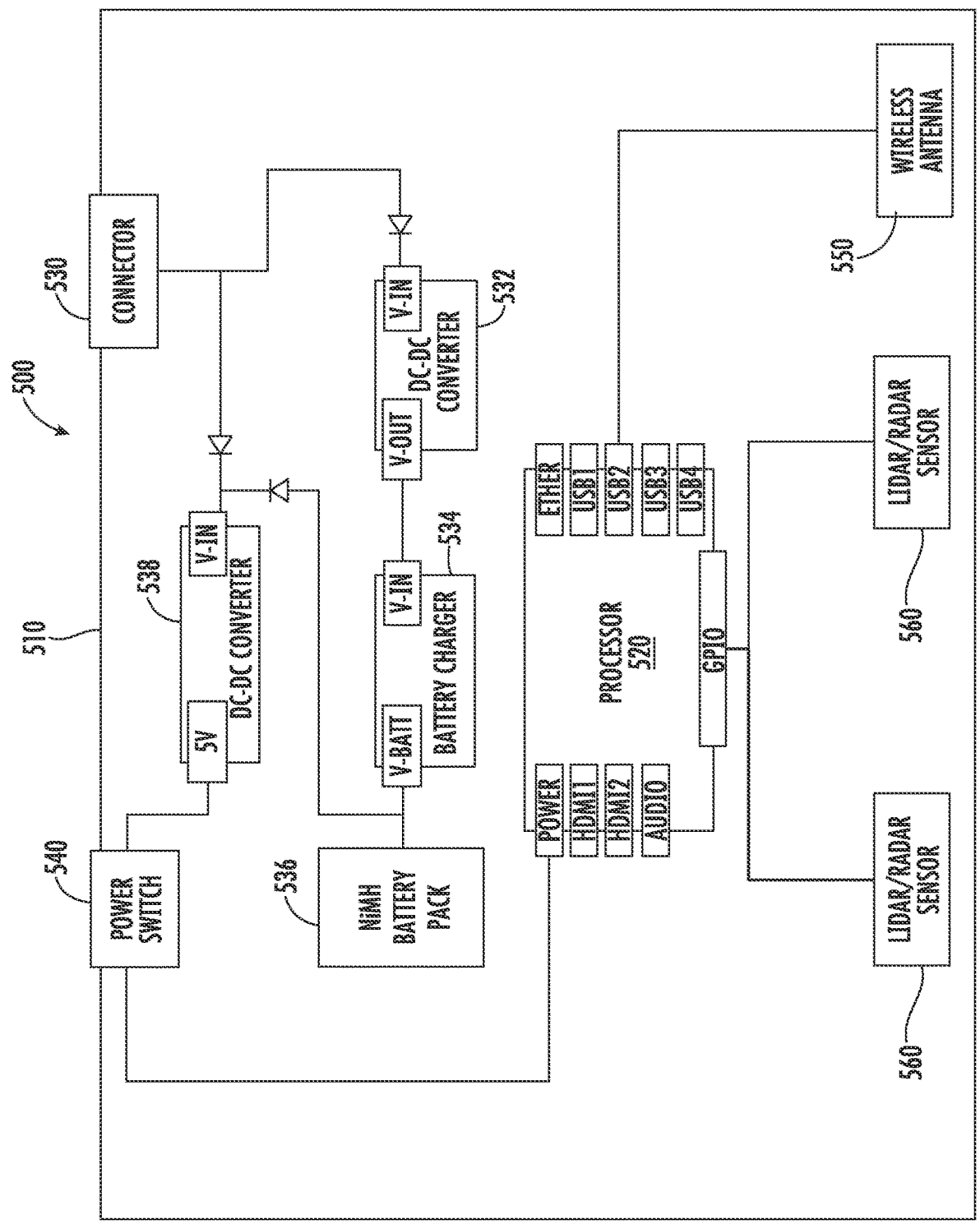
FIG. 7 is a schematic diagram for an example embodiment of the incremental counter shown in FIG. 6.

FIGS. 6 and 7 show aspects of one of the incremental counters 500 that the SAM system 100 comprises. An incremental counter 500 can be provided at any and/or all of the emergency exits of the aircraft 10, including the overwing emergency exits 60 but excluding the emergency exit doors 20 since the display modules 300 already perform similar functionality there. In the example embodiment shown in FIG. 6, the incremental counter 500 is shown positioned in an overwing position, between two overwing emergency exits 60. The incremental counter 500 comprises a sensor 560 (e.g., one for each emergency exit 60 with which it is associated, so that the incremental counter 500 in FIG. 6 has 2 sensors 560) for counting persons exiting the aircraft 10. Thus, in the example embodiment shown herein, the incremental counters 500 are configured to count passengers as they pass through one of the overwing emergency exits 60 and to transmit the quantity of persons who have passed through the overwing emergency exit 60 to the display modules 300.

Figure 5:
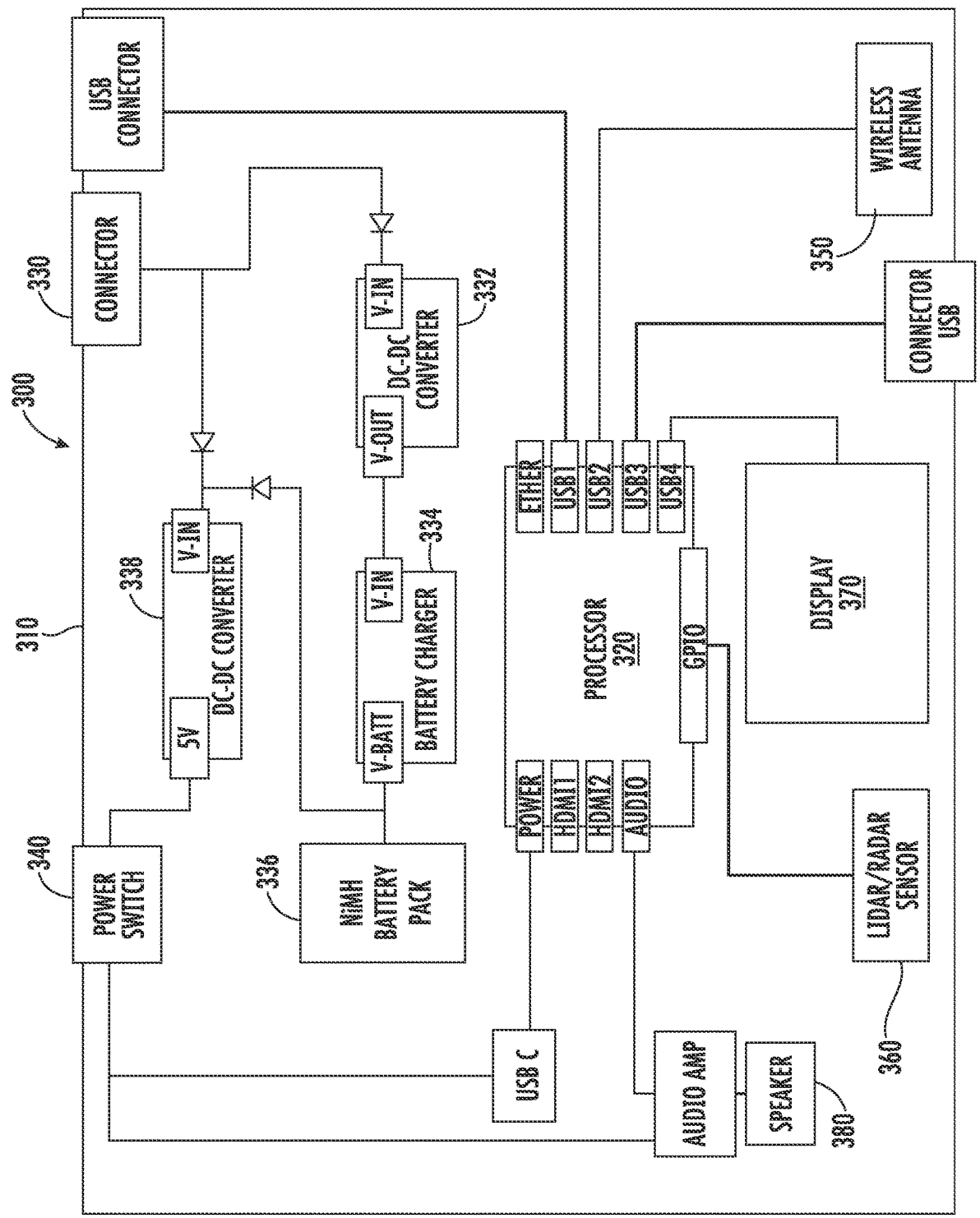
FIG. 5 is a schematic diagram for an example embodiment of a display module for the improved situational awareness monitoring system disclosed herein.

The incremental counters 500 thus, starting from a value of zero upon initiation of the emergency evacuation indicator and/or of transmission of an emergency evacuation signal, count the quantity of persons in increments of 1 that have been evacuated from the aircraft 10 through one or more of the overwing emergency exits 60. As shown in FIG. 5, one incremental counter 500 can be provided adjacent to (e.g., between) two overwing emergency exits 60 that are directly adjacent to each other (e.g., so close as to allow for an accurate counting of persons passing through both overwing emergency exits 60). The incremental counters 500 may output (e.g., in realtime) a value of the quantity of persons that the incremental counter 500 has detected being evacuated from the aircraft 10 to a central controller in lieu of or in addition to the display modules 300, in some embodiments. The controller and/or display modules 300 can then sum the output values from all of the incremental counters 500 to determine how many people have been evacuated from the aircraft 10 at any given point in time during the emergency evacuation event and, at least as importantly, by comparing the total quantity of people who have been evacuated from the aircraft 10 with a passenger and crew manifest (e.g., by knowing the total quantity of people onboard the aircraft upon takeoff), the controller and/or the display modules 300 can determine the quantity of people remaining on the aircraft 10 during an emergency evacuation event in real-time and can present this information to cabin crew members 1 responsible for the orderly evacuation of passengers from the aircraft 10.

In some embodiments, each of the incremental counters 500 transmits the count (e.g., in realtime) of the quantity of passengers who have been detected passing through the overwing emergency exit 60 to each of the display modules 300. Thus, each display module 300 receives a realtime count from all of the incremental counters 500 and can use this, along with the passenger count input at the display module 300 by the cabin crew members 1 before flight, to display at each of the display modules 300 (e.g., those not powered off by the cabin crew) a total count of passengers that have already been evacuated from the aircraft 10 and/or a total count of passengers remaining on the aircraft 10. The incremental counter 500 is powered and begins counting the quantity of passengers detected passing through the overwing emergency exits 60 with which the incremental counter 500 is associated; this occurs upon receipt of an emergency evacuation signal at the incremental counter 500, whether from the cabin crew, flight crew, or automatically. The incremental counter 500 operates autonomously without the need for a human-machine interface (e.g., input/output device). Thus, the incremental counter 500 is advantageously operable without any such human-machine interface. The status of the incremental counter 500 is monitored by the display module 300.

The incremental counters 500 are installed at each of the overwing emergency exits 60, or pairs of overwing emergency exits 60. The incremental counter 500 has a sensor 560 for counting passengers exiting the aircraft 10 and sending the data regarding the quantity of passengers counted to the display module 300 for displaying a total count of the passengers exiting the aircraft 10 on the display module 300 screen. In the example embodiment shown, the sensor 560 is a Lidar and/or radar sensor. The incremental counters 500 are each provided with a battery backup 536 to remain operable upon being disconnected from a power source 600 of the aircraft. The incremental counters 500 are integrated into the door surround area of the overwing emergency exits 60 with a wired connection to aircraft power. Wireless operation between the incremental counters 500 and the display modules 300 is preferred, however, if a wireless connection is not workable for a particular implementation, then a data line can be connected between the incremental counter 500 and the display module 300.

As shown in the schematic of FIG. 7, the incremental counter 500 comprises a sensor 560 (e.g., lidar or radar) that is used to detect the passage of persons through the field of view of the sensor 560. The incremental counter 500 further comprises a voltage converter 538 to convert aircraft line voltage received from a power connector 530 to an operating voltage (e.g., 5V) of the incremental counter 500 components, as well as a voltage converter 532 to convert aircraft line voltage to a voltage suitable for use by a battery charger 534 provided in the incremental counter 500. The battery charger 534 is connected to a battery 536 (e.g., NiMH), which feeds to the voltage converter 538 to convert the battery voltage to the operating voltage (e.g., 5V) of the incremental counter 500 components. The incremental counter 500 further comprises a wireless communications antenna 550 for communication with, for example, each of the display modules 300 of the SAM system 100. In some embodiments, the antenna 550 is a network mesh antenna. The incremental counter 500 further comprises a switch 540 that is configured to toggle the incremental counter 500 between an "on" state and an "off" state.

Figure 8:
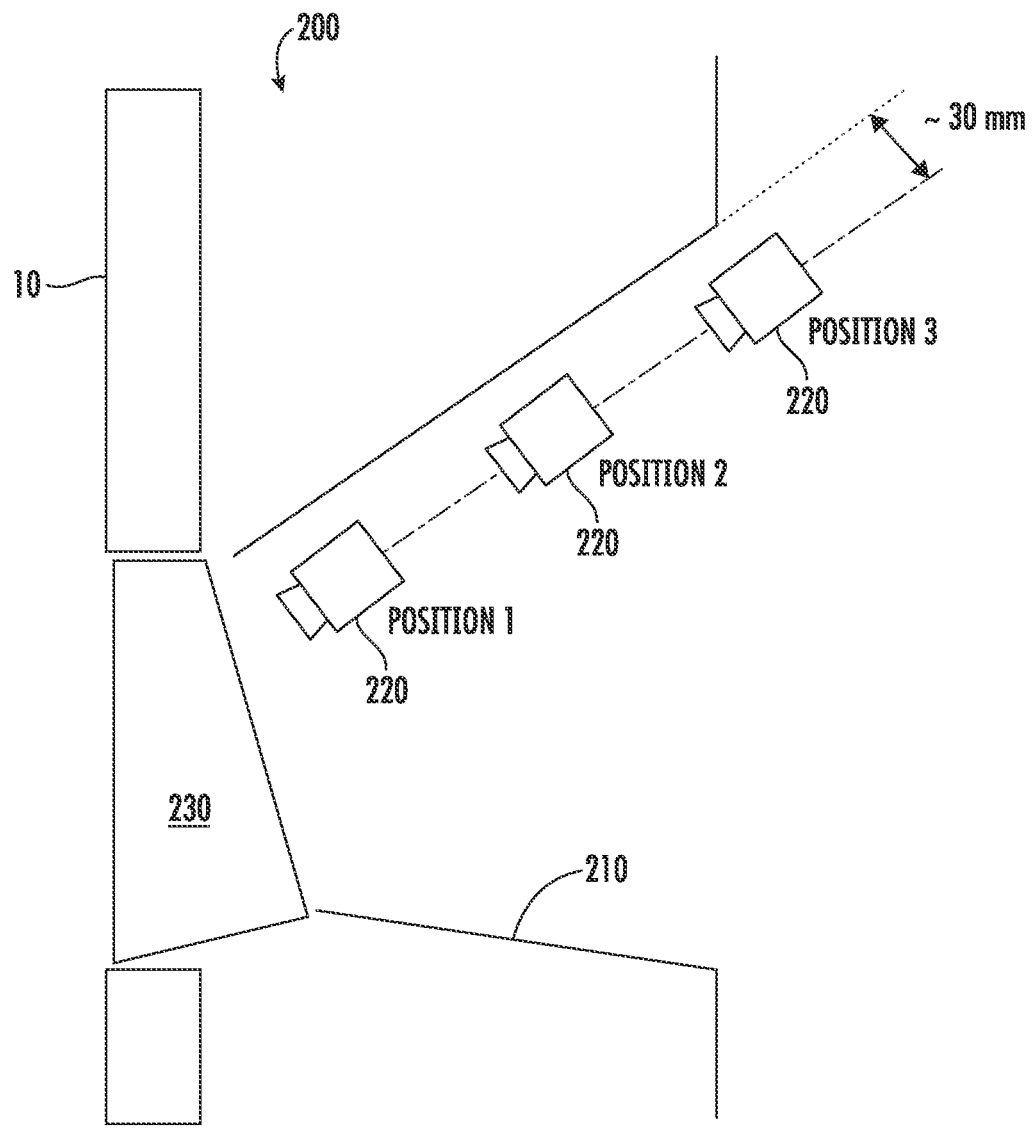
FIG. 8 is a side view of an example embodiment in which an imaging device of the improved situational awareness monitoring system is shown with respect to a window prism for viewing an external environment of an aircraft through the window prism.
Figure 9:
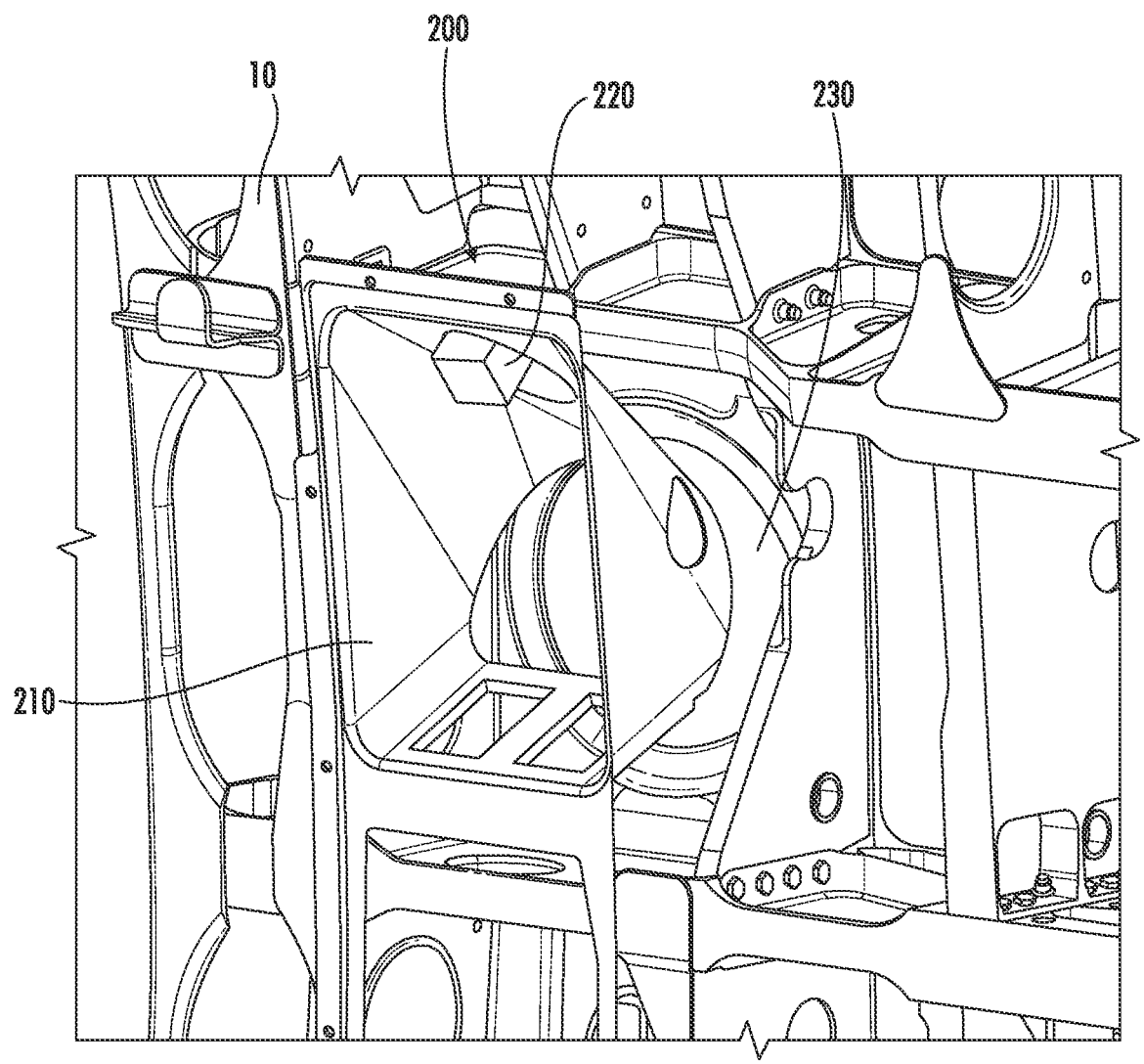
FIG. 9 is an isometric view of the imaging device, frame, and window prism of FIG. 8 provided within an aircraft cabin fuselage, adjacent to a window opening formed in the exterior of the aircraft cabin fuselage.

FIGS. 2, 8, and 9 show aspects of the door obstruction 400 that can be deployed (e.g., automatically or by a cabin crew member) as a physical barrier across an exit doorway to indicate that it is not safe to evacuate through a particular one of the emergency exit doors 20. When an already-opened emergency exit door 20 (e.g., door) becomes unsafe for further use during evacuation, a door obstruction 400 is provided (e.g., deployed) adjacent to each of such emergency exit doors 20 to mark each such emergency exit doors 20 as being unsafe for further use during the evacuation. In some embodiments, the door obstruction 400 can be deployed by a cabin crew member 1 (e.g., manually). In some embodiments, the door obstruction 400 can be deployed automatically, or in an automated manner. In the example embodiment disclosed herein, the door obstruction 400 comprises a strap 410 (e.g., an automatically retractable strap) and a screen 420, which is attached to and, in some embodiments hidden within, the strap 410. While marking an emergency exit door 20 as unsafe, a cabin crew member 1 can pull and hook the strap 410 to the other side of the opening of the emergency exit door 20. According to this example embodiment, when there is limited visibility (e.g., due to smoke) in the passenger cabin 30 and/or in instances where the passengers do not have good visibility (e.g., they might be crawling on the floor to evacuate the aircraft 10) the screen 420 can be deployed from the strap 410 (e.g. by pulling a string) so that the screen 420 will fall down naturally, aided by gravity, to block the emergency exit door 20

Figure 13:
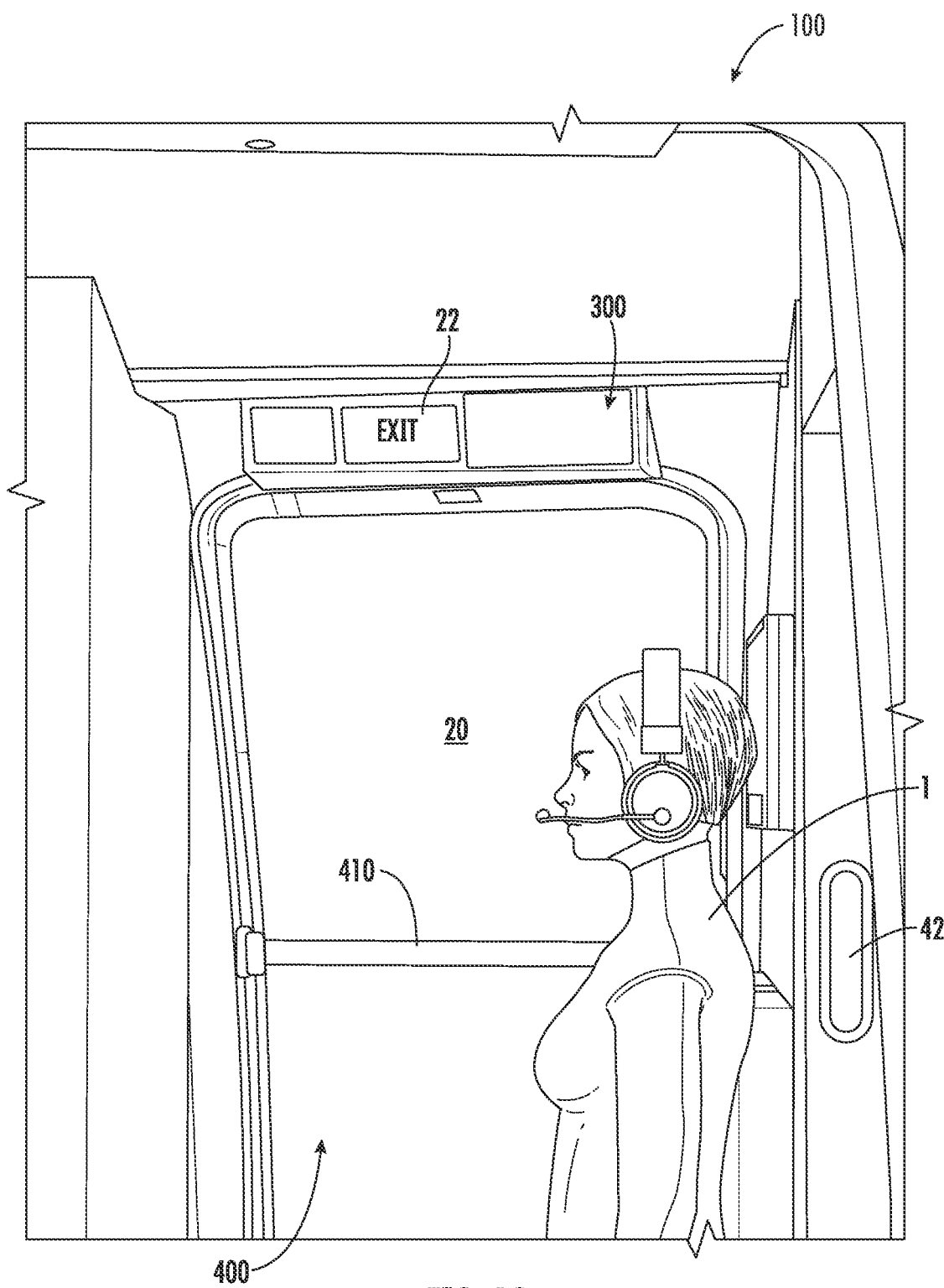
FIG. 13 is a side perspective view of a forward portion of a passenger cabin within an aircraft, in which a first example embodiment of a door obstruction is deployed.
Figure 14:
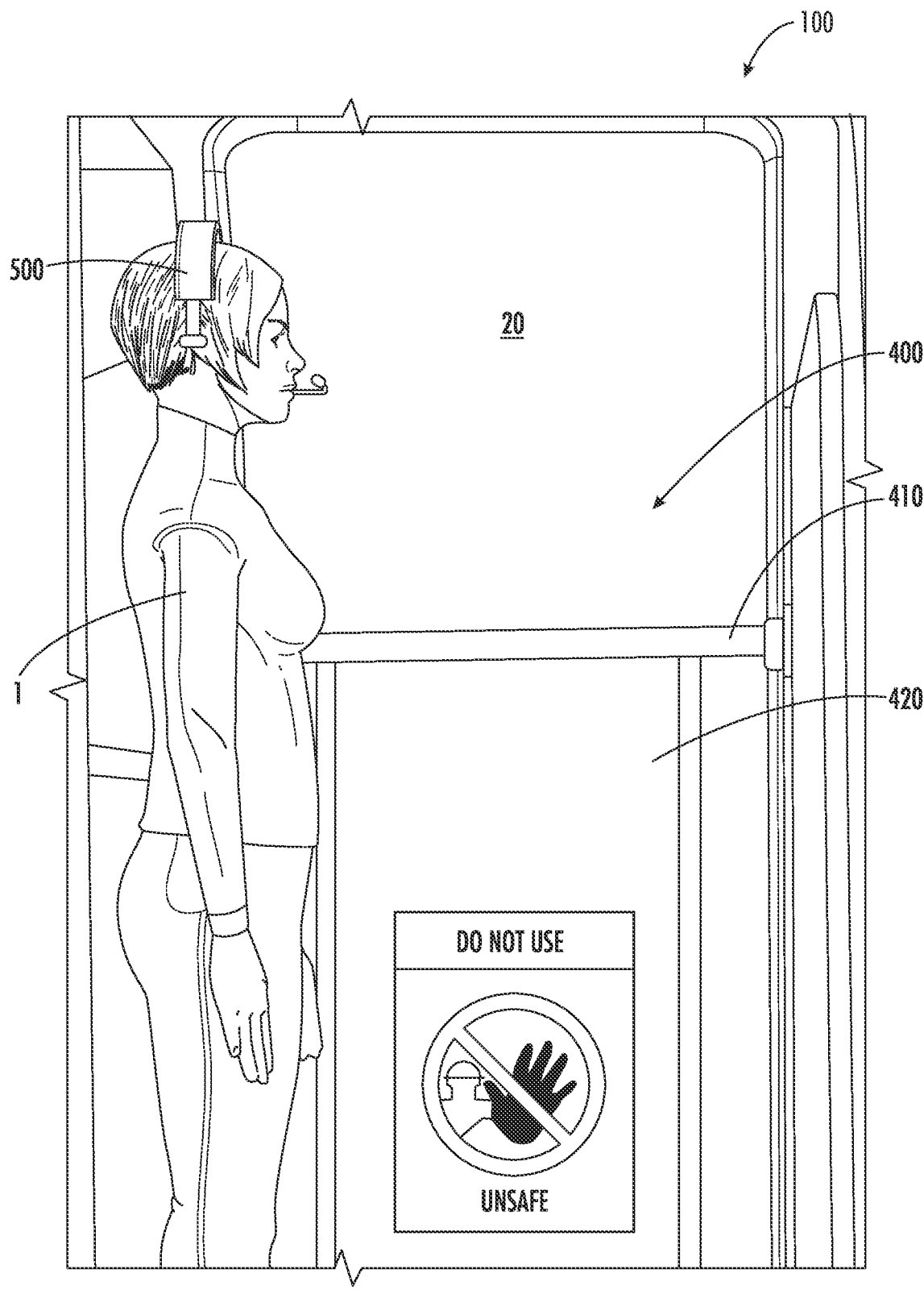
FIG. 14 is a side perspective view of a forward portion of a passenger cabin within an aircraft, in which the first example embodiment of the door obstruction shown in FIG. 13 is deployed across a doorway of an aircraft.

FIGS. 13 and 14 further show aspects of the cabin crew member headsets 500. Prior to emergency evacuation (e.g., during a cabin preparation phase) cabin crew members can retrieve and put on a headset 500 from a headset storage area. The headsets 500 enable direct, realtime, and hands-free communication between cabin crew members. The headset storage area comprises a charging station that ensures the headsets 500 will remain in a full-charged state for use during an emergency evacuation. In order to prevent a cabin crew member 1 at one emergency exit door 20 from hearing unnecessary and excessive noises from other emergency exit areas of the aircraft 10, the headsets 500 are operable such that, by the cabin crew member 1 pressing a button on the headset 500, clear communication with another cabin crew member 1 can occur.

The headset 500 is advantageously designed to be acoustically "open," meaning that ambient sounds are not blocked by the earpiece portion of the headset 500. Thus, the headset 500 is designed such that the earpiece will remain in place in and/or around the ear to maintain capability to understand verbal communications from other cabin crew members 1, but to still hear ambient noise from the environment around the cabin crew member 1. The headsets 500 are suitable for use throughout the evacuation process and also after evacuation is completed to aid in management of the passengers when outside the aircraft cabin. Thus, the headsets 500 are configured to provide communication between cabin crew members 1 during all phases of emergency cabin evacuation. The headsets 500 can communicate with each other via any suitable wireless communication protocol (e.g., Wi-Fi®, Bluetooth®, etc.) The headsets 500 may have and/or utilize a headset profile and a hands-free profile.

Figure 10:
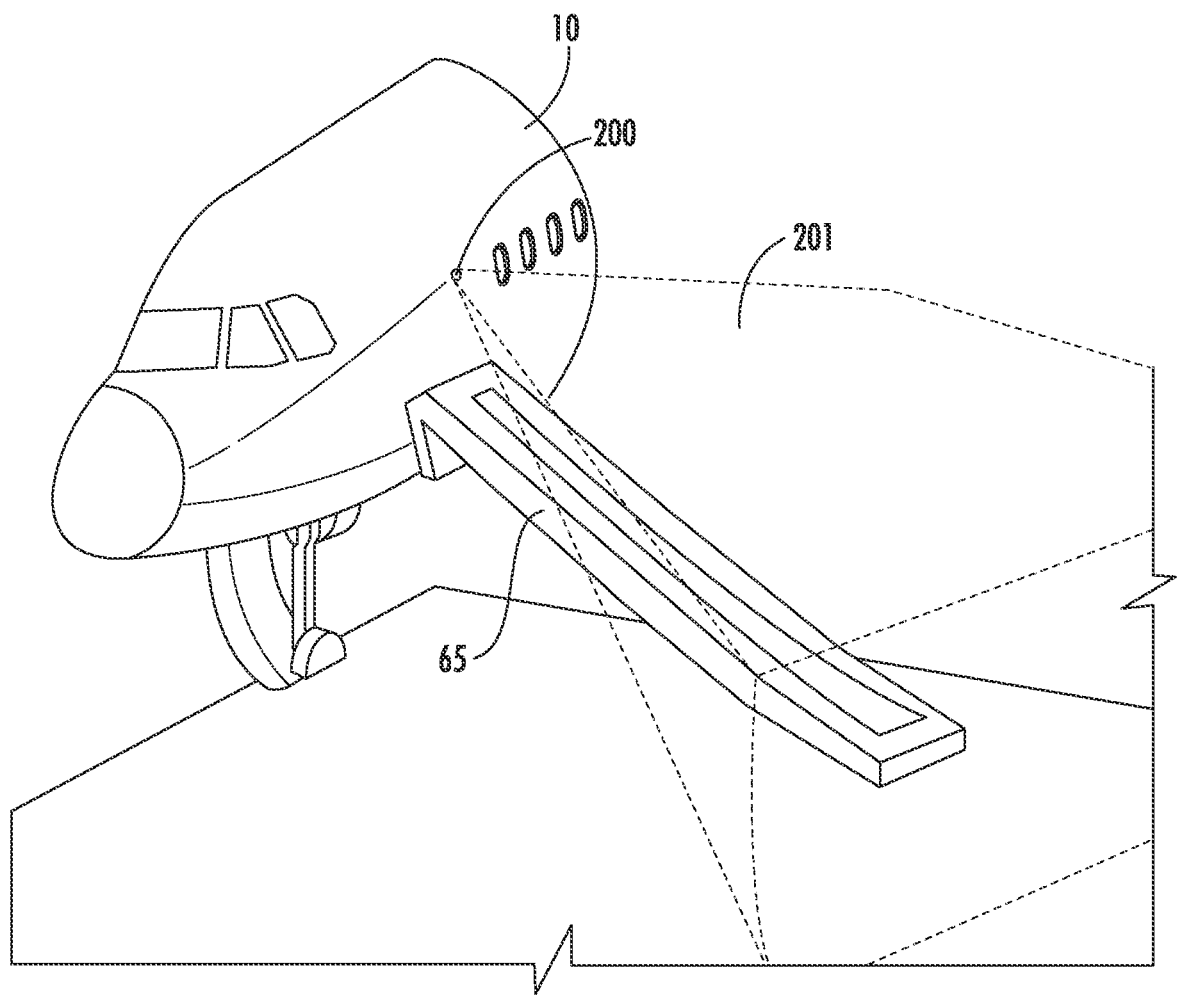
FIG. 10 is an isometric view of a portion of an aircraft comprising the improved situational awareness monitoring system, in which the field of view (FOV) of the imaging device thereof is shown with respect to an emergency evacuation slide of the aircraft.

FIGS. 8-10 show aspects of one of the imaging devices, generally designated 200, (e.g., "imagers") that the SAM system 100 comprises. The imaging devices 200 are installed in door view ports provided about the exterior of the aircraft 10 in any position in which it is advantageous to be able to provide to cabin crew members 1 a view of the external environment at the selected position about the exterior of the aircraft 10 where the imaging devices 200 are provided. The imaging devices 200 are positioned so as to be configured to provide a sufficiently intelligible camera view (e.g., wide angle) of the external environment at the emergency exit door 20 with which the imaging device 200 is associated. The imaging devices 200 are configured to provide an image, or series of images (e.g., a video) that can be viewed in all lighting conditions. Thus, In the example embodiment shown herein, the imaging device 200 is a wide-angle pinhole camera configured to provide views in all lighting conditions. The imaging device 200 is configured to send the camera data (e.g., image, or images) to the display module 300 for viewing on the screen 370 of the display module 300 by the cabin crew members 1 for determining whether an emergency exit door 20 is safe for use or not. The imaging devices 200 are installed over the door viewport and/or in a passenger widow with a wired connection to the display module 300 for power and data interface.

As shown in FIGS. 8 and 9, each imaging device 200 is positioned within a housing 210 of an emergency exit door 20 and is positioned such that a window prism 230 occupies all or some of the field of view of the imaging device 2. The window prism 230 is provided to change an effective angle of the field of view of the imaging device 200. The imaging device 200 can be movable between different positioned based on the aircraft 10 in which the SAM system 100 is being installed. As shown in FIG. 13, the imaging device 200 is directed, via the window prism 230, to have a field of view that encompasses an entirety of the environment outside of the aircraft 1—adjacent to the emergency exit door 20 at which the imaging device 200 is provided.

Figure 11:
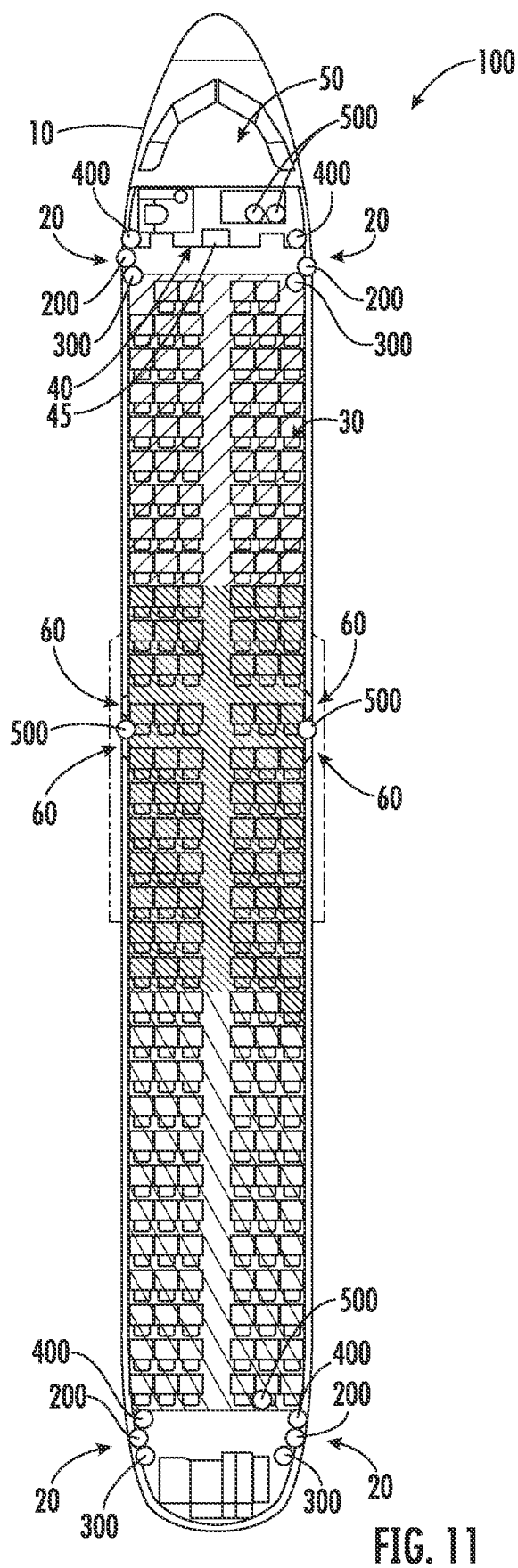
FIG. 11 is a top view of an example aircraft in which components of an example embodiment of an improved situational awareness monitoring system disclosed herein are schematically illustrated.

FIG. 11 is a top plan view of an example embodiment of a fuselage of the aircraft 10 with components of the SAM system 100 installed therein. As shown in the example embodiment of FIG. 11, the aircraft has a total of eight (8) emergency exits 20, 60, including two emergency exit doors 20 at the front of the aircraft 10, two emergency exit doors 20 at the rear of the aircraft 10, and two pairs of overwing emergency exits 60 in an overwing position, in a middle of the fuselage of the aircraft 10, from front-to-back. The center-forward attendant space 45 is provided adjacent to and between the emergency exit doors 20 at the front of the aircraft 10. Cabin crew headsets 500 are provided at the forward and aft areas of the aircraft 10. A display module 300, imaging device 200, and door obstruction 400 are provided at each of the emergency exit doors 20 at the front and rear of the aircraft 10. An incremental counter 500 is provided at each of the pairs of overwing emergency exits 60.

Figure 12:
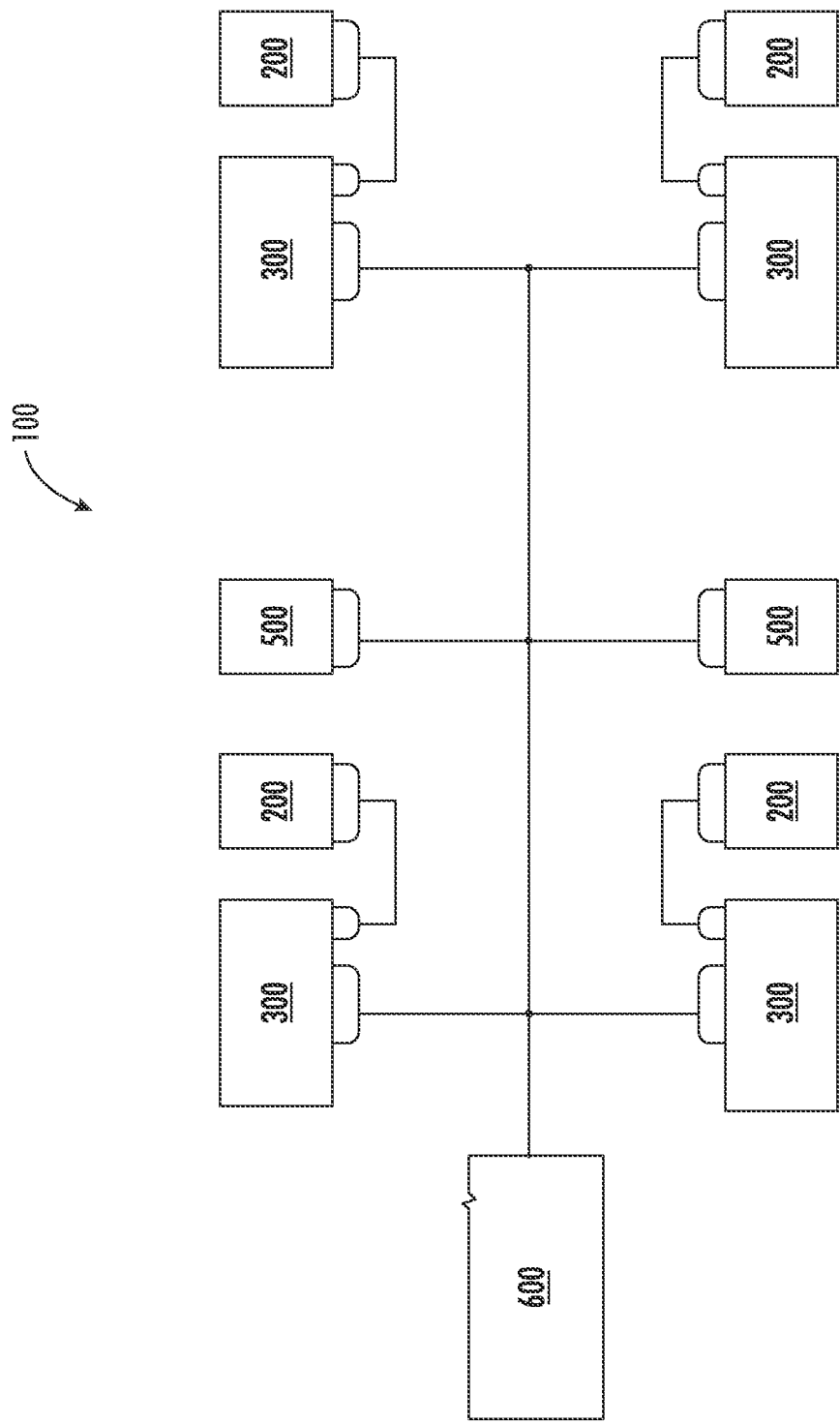
FIG. 12 is a function diagram for an example embodiment of the improved situational awareness monitoring system disclosed herein.

FIG. 12 is a function diagram for an example embodiment of the SAM system 100 disclosed herein. 28 VDC power is supplied from a power supply 600 of the aircraft 10 to the display modules 300 and the incremental counters 500. The display modules 300 are wired directly to a respective one of the imaging devices 200; this wired connection provides power and data transfer functionality between the respective pairs of display modules 300 and the imaging devices 200. The display modules 300 and the incremental counters 500 communicate with each other through a wireless mesh network which supports data sharing (e.g. passenger counts, no video streams).

Figure 15:
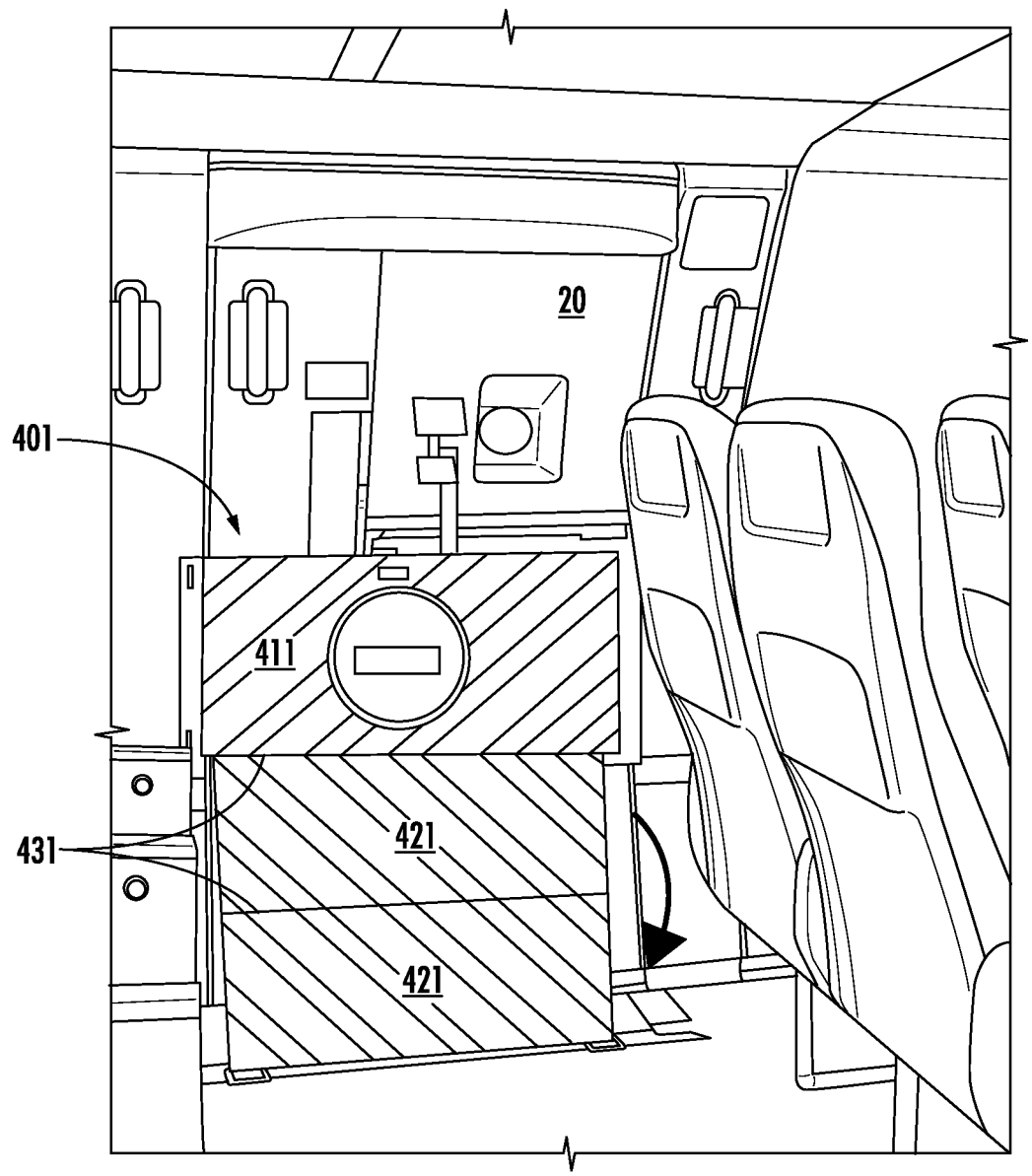
FIG. 15 is a perspective view of a second example embodiment of a door obstruction for deploying across a doorway of an aircraft.

FIG. 15 is a perspective view of a second example embodiment of a door obstruction, generally designated 401, in a deployed position so as to physically block or obstruct passage through one of the emergency exit doors 20 of the aircraft 10. In the example embodiment shown herein, the door obstruction 401 has a segmented, panel-like structure, including a main panel 411 and two secondary panels 421 that are attached sequentially to the lower edge of the main panel 411 by hinge elements 431. The hinge elements 431 can be, for example, creases between adjacent panel segments that facilitate folding. The first secondary panel 421 is attached directly to the bottom edge of the main panel 411 and the second secondary panel 421 is attached directly to the bottom edge of the first secondary panel 421. In the deployed configuration shown in FIG. 16, the secondary panels 421 unfold automatically (e.g., aided by gravity, in the direction indicated by the arrow) vertically down from the main panel 411, such that the door obstruction 401 can be deployed automatically upon being extended across the emergency exit door 20 by a cabin crew member. The main panel 411 and/or the secondary panels 421 can be a flexible member (e.g., so as to be able to be stored in a rolled configuration when not deployed) in some embodiments. The main panel 411 and/or the secondary panels 421 can be a rigid member in some embodiments. The door obstruction 401 is advantageously reusable, such as, for example, by folding the secondary panels 421 against the main panel 411 and allowing the door obstruction 401 to move into a retracted position (e.g., rolled up) around, for example, a spring-actuated roller at the right of the main panel 411. The door obstruction can be secured across the emergency exit door 20 at an opposite end of the main panel 411 from where the door obstruction 401 is held in the retracted position.

Figure 16:
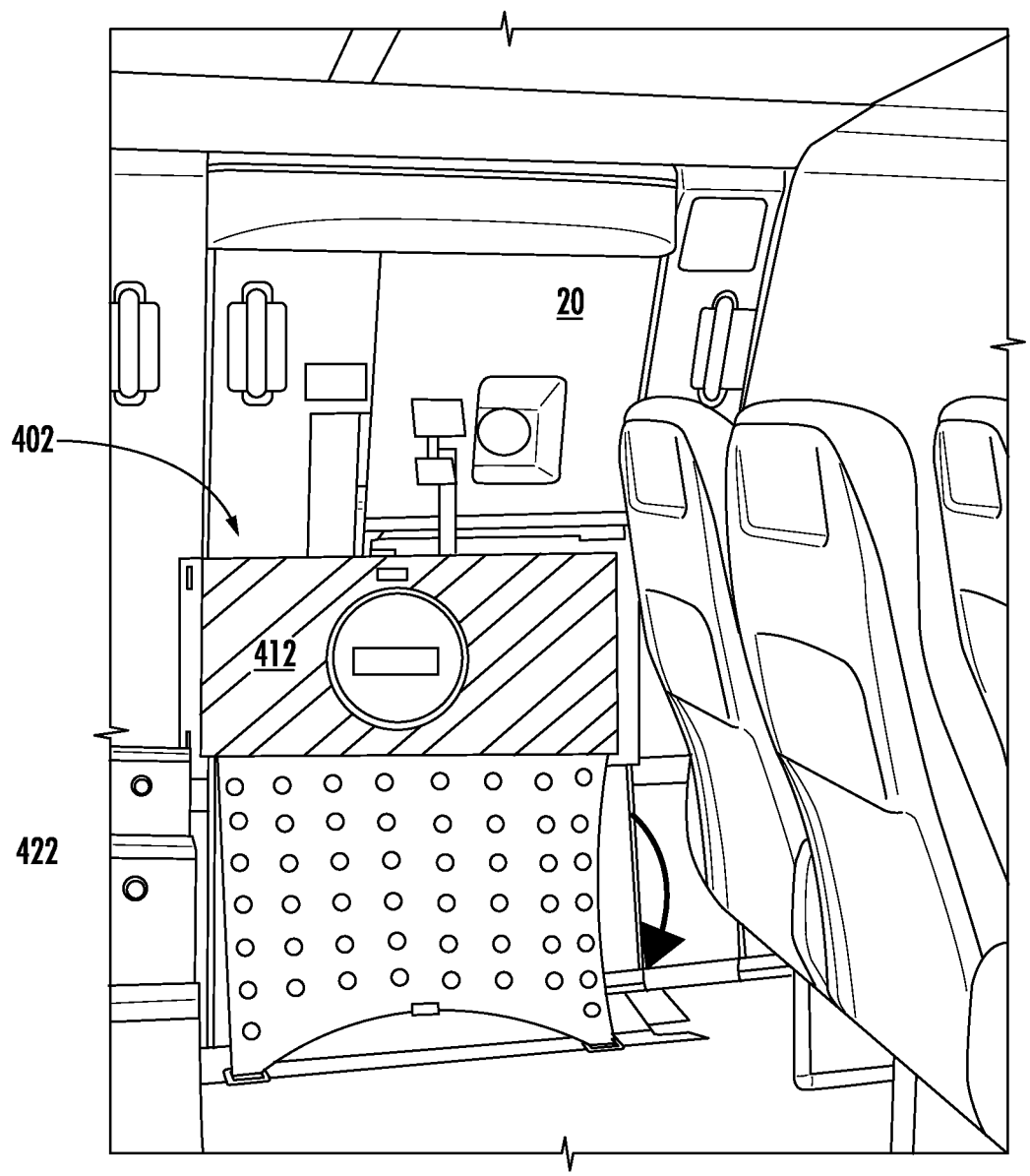
FIG. 16 is a perspective view of a third example embodiment of a door obstruction for deploying across a doorway of an aircraft.

FIG. 16 is a perspective view of a third example embodiment of a door obstruction, generally designated 402, in a deployed position so as to physically block or obstruct passage through one of the emergency exit doors 20 of the aircraft 10. In the example embodiment shown herein, the door obstruction 402 has a segmented, panel-like structure, including a main panel 412 and a secondary panel 422 that is attached to the lower edge of the main panel 411. The secondary panel 422 is attached directly to the main panel 412 (e.g., at the bottom edge of the main panel 412). In the deployed configuration shown in FIG. 16, the secondary panel 422 is extendable from a bottom edge of the main panel 412 (e.g., aided by gravity), such that the door obstruction 402 can be deployed automatically upon being extended across the emergency exit door 20 by a cabin crew member. In some embodiments, the secondary panel 422 is pulled in a downwards direction by a cabin crew member to deploy the secondary panel 422 from the bottom edge of the main panel 412. The main panel 412 and/or the secondary panel 422 can be a flexible member (e.g., so as to be able to be stored in a rolled configuration when not deployed) in some embodiments. The main panel 412 and/or the secondary panel 422 can be a rigid member in some embodiments. The door obstruction 402 is advantageously reusable, such as, for example, by retracting the secondary panel 422 against the main panel 412 and allowing the door obstruction 402 to move into a retracted position (e.g., rolled up) around, for example, a spring-actuated roller at the right of the main panel 412. The door obstruction can be secured across the emergency exit door 20 at an opposite end of the main panel 412 from where the door obstruction 402 is held in the retracted position.

Figure 17:
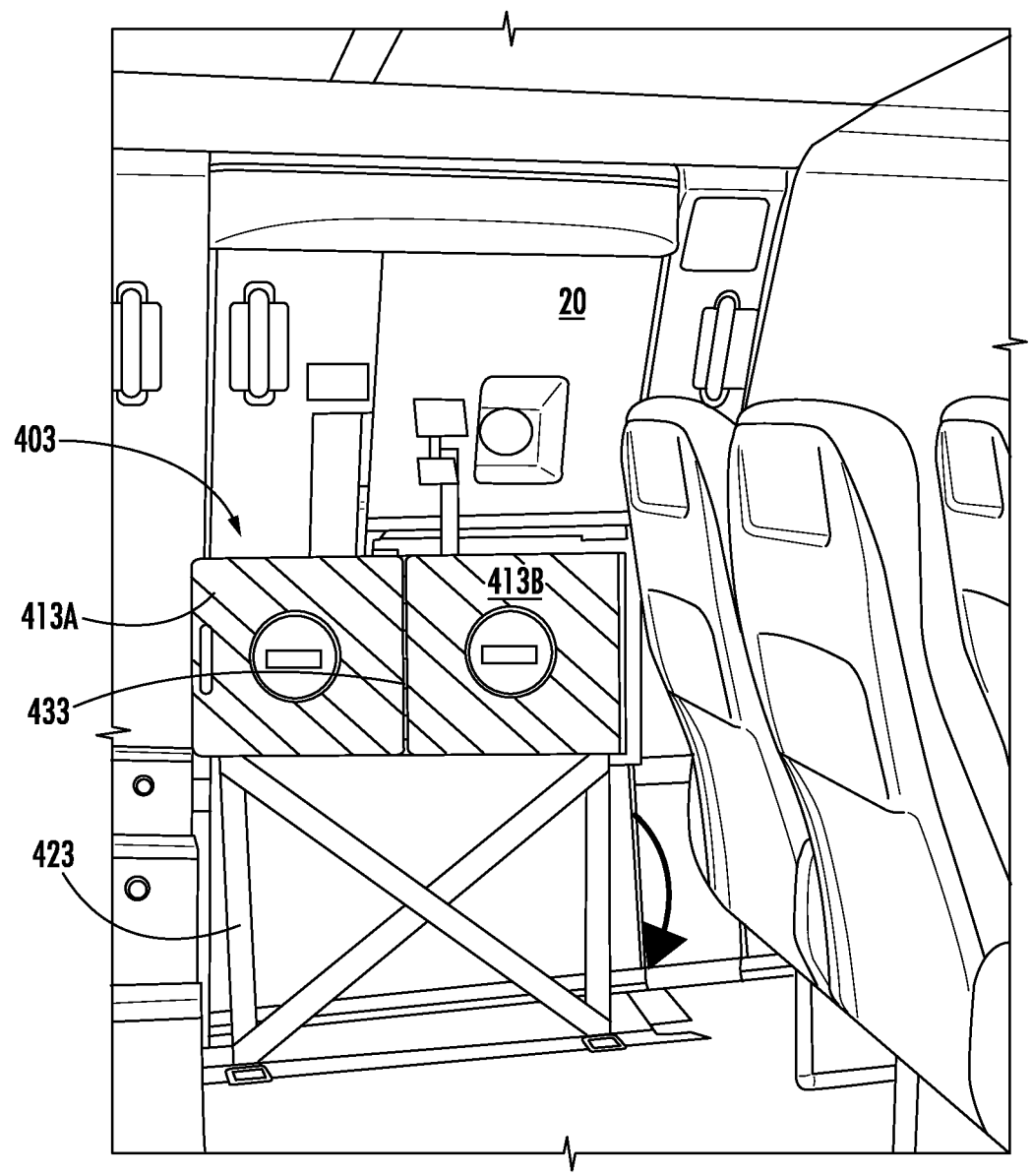
FIG. 17 is a perspective view of a fourth example embodiment of a door obstruction for deploying across a doorway of an aircraft.

FIG. 17 is a perspective view of a fourth example embodiment of a door obstruction, generally designated 403, in a deployed position so as to physically block or obstruct passage through one of the emergency exit doors 20 of the aircraft 10. In the example embodiment shown herein, the door obstruction 403 has a segmented, panel-like structure, including two main panels 413A, 413B and a secondary structure 423 that is attached to the lower edge of the main panels 413A, 413B and is in the form of an "X". The secondary structure 423 is attached directly to the main panel 412 (e.g., at the bottom edge of the main panel 412). In the deployed configuration shown in FIG. 16, the secondary structure 423 is extendable from a bottom edge of the main panel 412 (e.g., aided by gravity), such that the door obstruction 403 can be deployed automatically upon being extended across the emergency exit door 20 by a cabin crew member. In some embodiments, the secondary structure 423 is pulled in a downwards direction by a cabin crew member to deploy the secondary structure 423 from the bottom edge of the main panel 412. In this example embodiment, the main panels 413A, 413B are each a rigid member that are pivotably connected to each other at hinge element 433, which can be in the style of a piano hinge, for example and without limitation. The door obstruction 403 is advantageously reusable, such as, for example, by retracting the secondary structure 423 against the main panels 413A, 413B and allowing the door obstruction 403 to move into a retracted position. The door obstruction can be secured across the emergency exit door 20 at an opposite end of the main panels 413A, 413B from where the door obstruction 403 is held in the retracted position.

Figure 18:
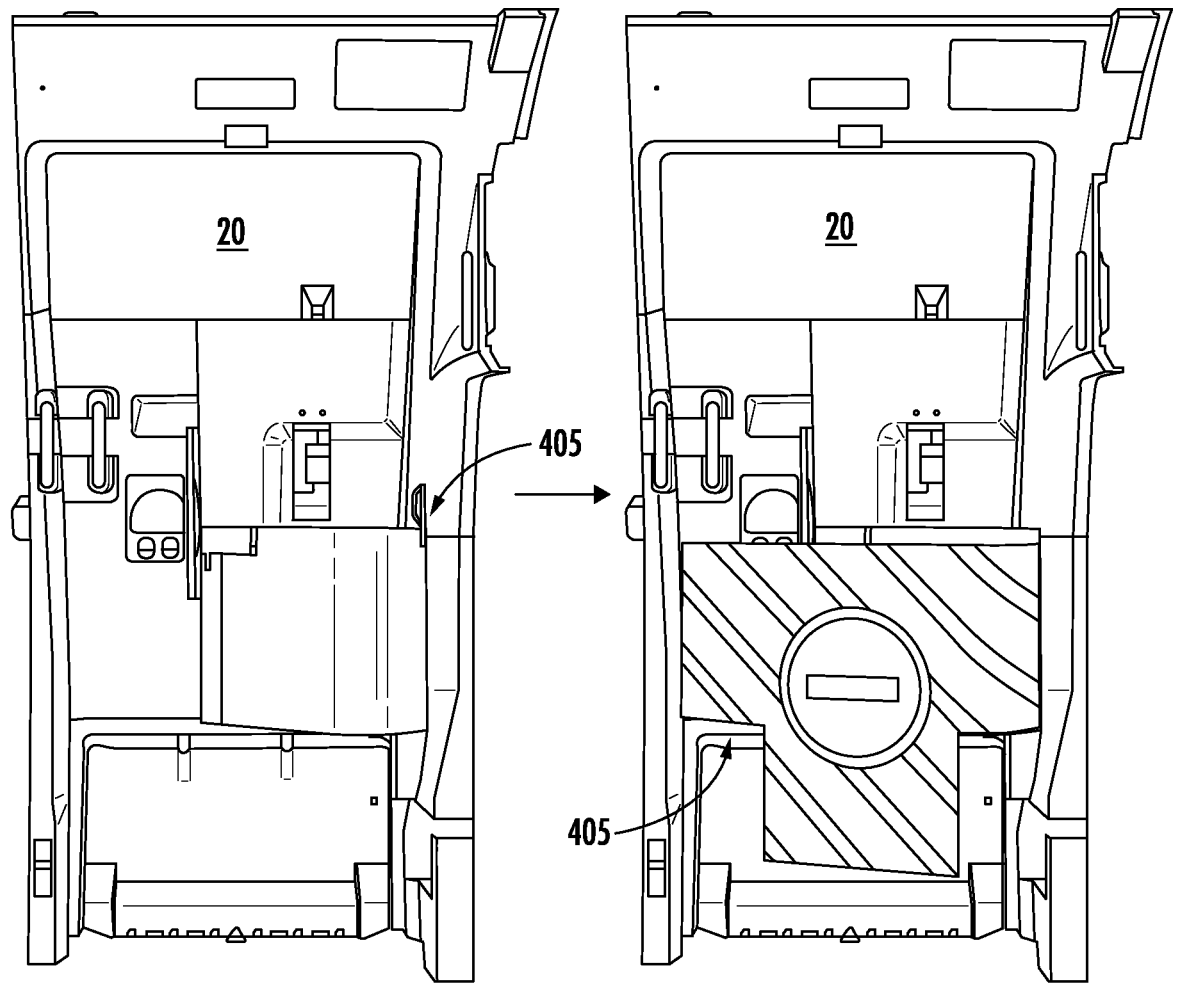
FIGS. 18-21 show various aspects of a fifth example embodiment of a door obstruction for deploying across a doorway of an aircraft.
Figure 19:
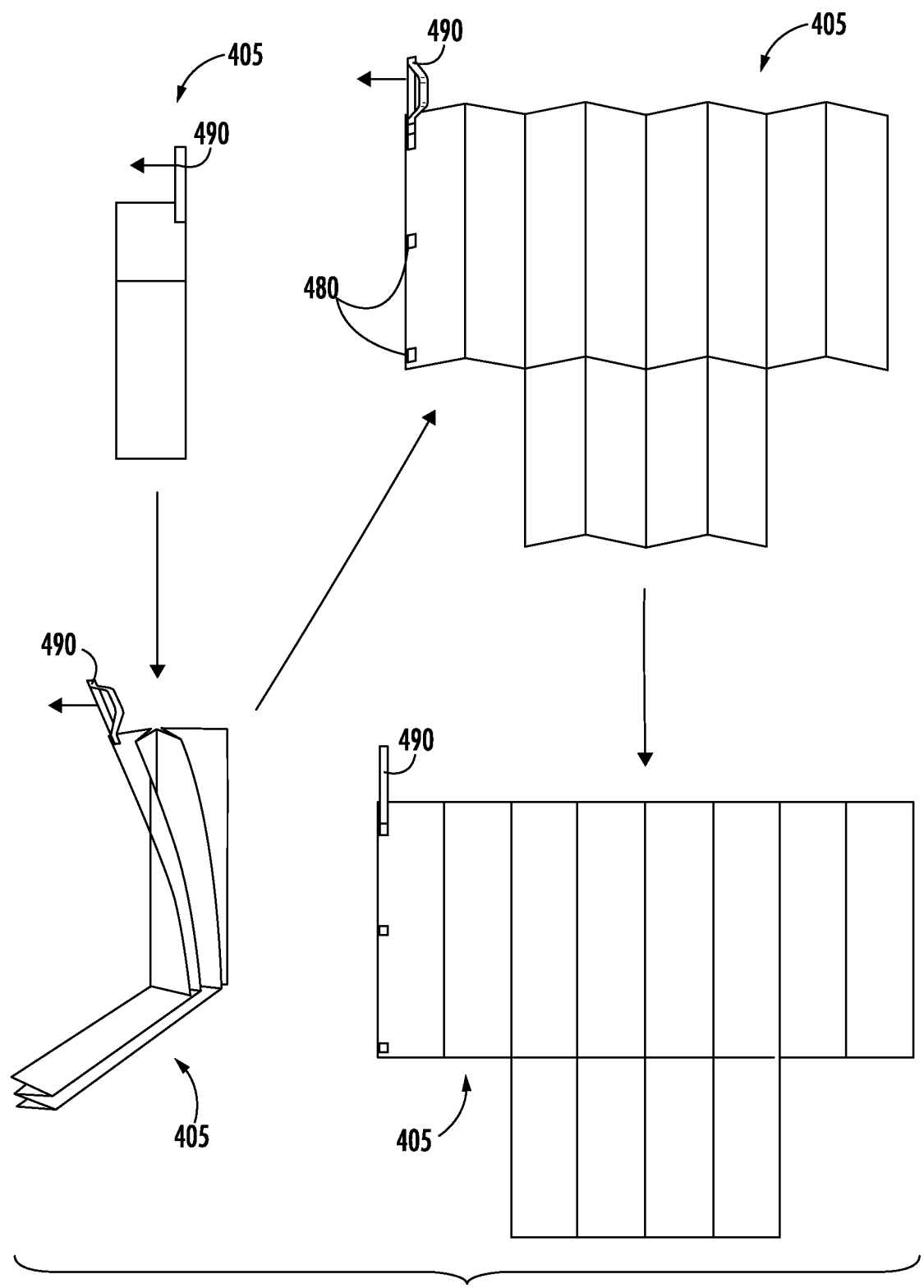

FIGS. 18-21 show various aspects of a fifth example embodiment of a door obstruction, generally designated 405, for deploying so as to physically block or obstruct passage through one of the emergency exit doors 20 of the aircraft 10. In FIG. 18, the left image shows the door obstruction 405 in the retracted position and the right image shows the door obstruction 405 in the deployed position. FIG. 19 shows a method by which the door obstruction 405 is deployed. In a first step, the handle 490 is pulled in the direction indicated by the arrow extending therefrom, which causes the lower flap section to separate from and pivot about a common edge with the upper flap section. Then, in a next step, the handle 490 is pulled in the same direction as previously indicated, such that the upper and lower flap sections are extended in a lateral direction. In a final step, the door obstruction 405 is shown fully extended.

Figure 20:
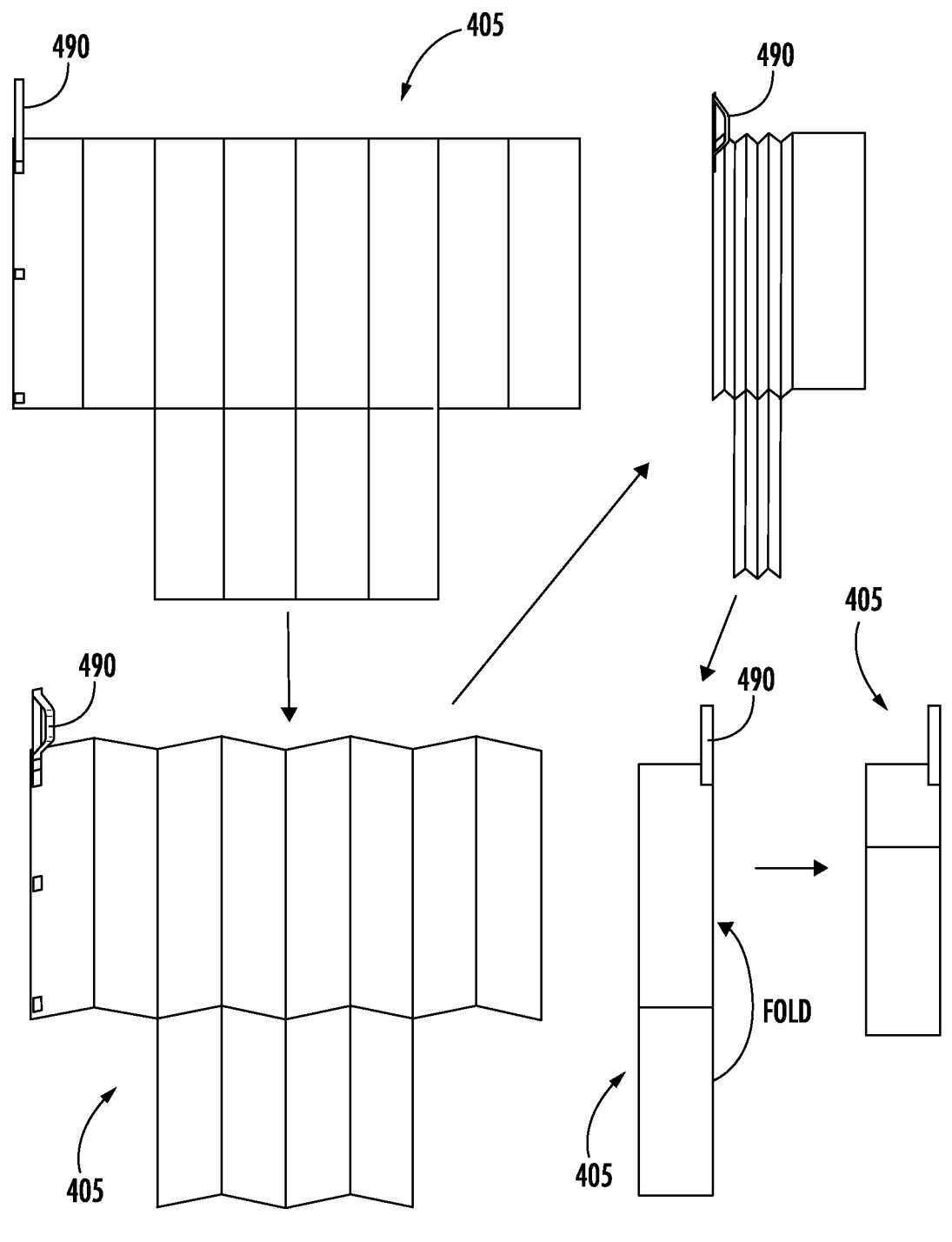

FIG. 20 shows a method by which the door obstruction 405 is retracted, starting from the fully deployed configuration shown in the final step of FIG. 19. In a first step, the handle 490 is pulled in the opposite direction from the direction in which it was pulled in the method shown in FIG. 19, such that the segments, or panels, of the door obstruction 405 are in an accordion-style configuration. In a next step, the retracting movement via the handle 490 is continued. In a next step, the lower flap section is folded in the direction indicated by the arrow so that the lower flap section will be folded over the upper slap section, as shown in the final step of the retraction method.

Figure 21:
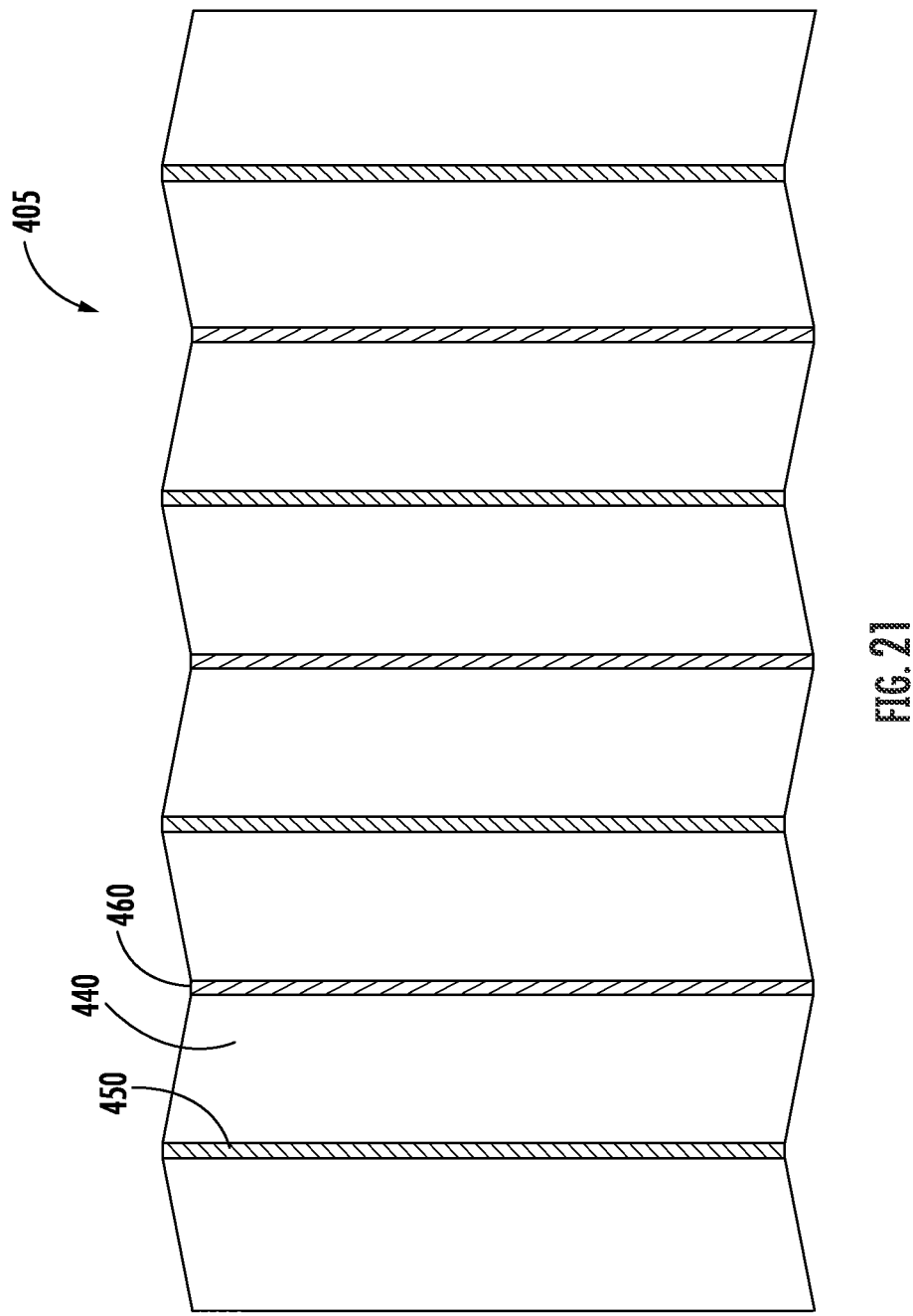

FIG. 21 shows various aspects of a portion of the door obstruction 405, which comprises panel segments 440 that are connected to each other within a same flap segment by vertical crease lines. As shown, there is a laminated, or coated section, along the length of each of the vertical crease lines to ensure that the panels 440 fold onto each other in the prescribed manner (e.g., in the manner of an accordion). The front reinforcement 450 exerts a pivoting force between adjacent panels on the same side of the door obstruction on which such front reinforcement 450 is formed to pivot the faces of such panels 440 towards each other. The rear reinforcement 460 exerts a pivoting force between adjacent panels on the same side of the door obstruction on which such rear reinforcement 460 is formed to pivot the faces of such panels 440 towards each other. The front reinforcements 450 are on the opposite side of the door obstruction 405 from the rear reinforcements 460.

Figure 22:
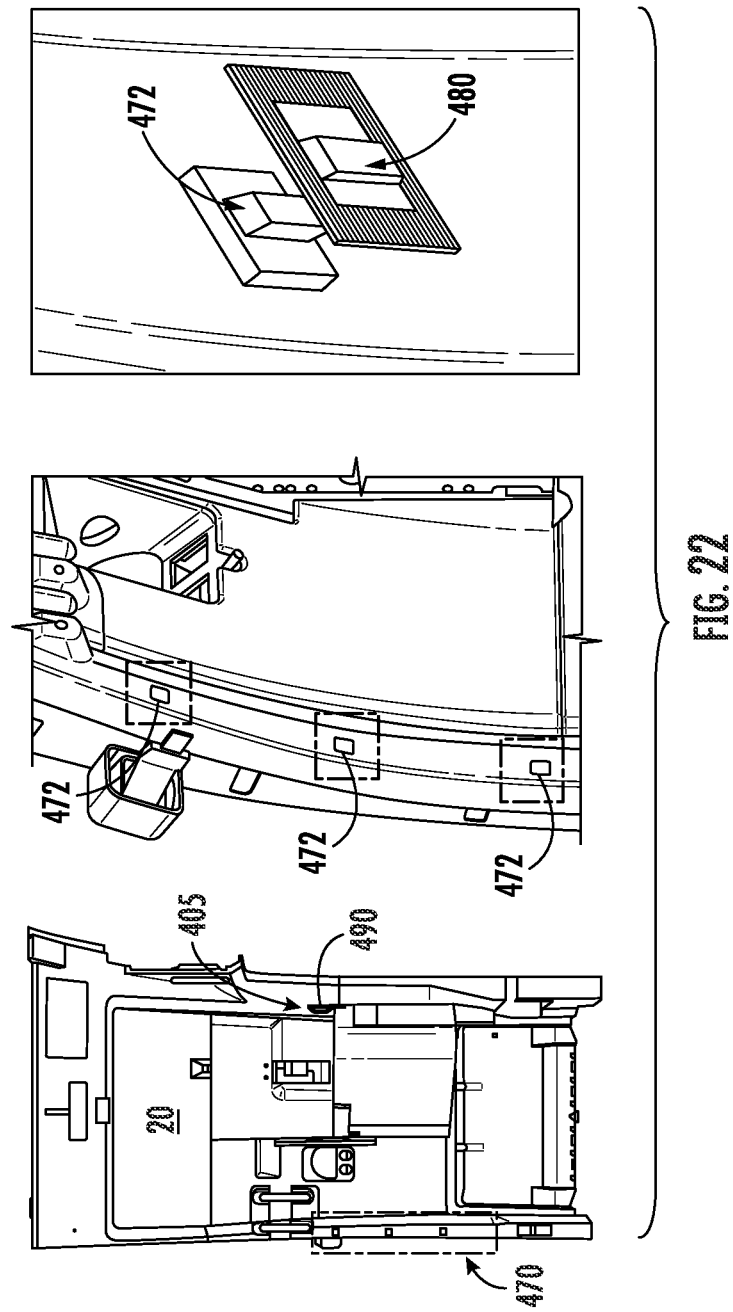
FIG. 22 is an illustration of a magnetic fastener for use in securing the door obstruction shown in FIGS. 18-21 across a doorway of an aircraft.

FIG. 22 shows an example embodiment by which the fifth example embodiment of the door obstruction 405 can be removably secured across an emergency exit door 20 of the aircraft 10. In the retracted position, the door obstruction 405 is provided on a hinge side of the emergency exit door 20. On the opposite edge of the emergency exit door 20 from the door obstruction 405 is a latching region, generally designated 470. The latching region 470 comprises one or more (e.g., three) latching anchors 472 that are rigidly attached to the aircraft 10. Each of the latching anchors 472 is spaced apart a same distance as the attachment anchors 480 that are rigidly attached to the door obstruction 405 (see, e.g., FIG. 19). The attachment anchors 480 are configured to engage with a corresponding one of the latching anchors 472 to secure the door obstruction 405 in a deployed position. The attachment anchors 480 can be, for example, sewn into the door obstruction 405. A vertical spacing between and a respective vertical positioning of the latching anchors 472 is advantageously substantially identical to a vertical spacing between and a respective vertical positioning of the attachment anchors 480.

It is understood that the example embodiments disclosed herein are not limiting and do not restrict the object disclosed herein. In particular, it will be evident to the person skilled in the art that the features described herein may be combined with each other arbitrarily, and/or various features may be omitted therefrom, without any resultant devices, systems, and/or methods deviating from the subject matter disclosed herein.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An aircraft comprising:
an aircraft fuselage having a passenger cabin and a cockpit;
a center-forward attendant space located between the passenger cabin and the cockpit and configured for a cabin crew member of the aircraft to stand therein and monitor progress of an emergency evacuation of the aircraft;
one or more emergency exits for providing egress of passengers from the aircraft fuselage during the emergency evacuation; and
a situational awareness monitoring (SAM) system for use in monitoring the emergency evacuation of the passengers from the aircraft, the SAM system comprising:
one or more imaging devices; and
one or more display modules, each of which is configured to display within the passenger cabin images captured by a corresponding one of the one or more imaging devices.

2. The aircraft of claim 1, wherein the one or more emergency exits comprise a plurality of emergency exit doors at a front and/or rear of the aircraft fuselage and/or a plurality of overwing emergency exits provided within the passenger cabin, in an overwing position.

3. The aircraft of claim 2, wherein:
the SAM system comprises, for each of the plurality of overwing emergency exits or for pairs of immediately adjacent overwing emergency exits, an incremental counter configured to detect egress of a person from the passenger cabin through the overwing emergency exit or the pair of immediately adjacent overwing emergency exits associated with the incremental counter; and/or
each of the display modules is provided at a corresponding one of the plurality of emergency exit doors and comprises an incremental counter configured to detect egress of a person from the aircraft fuselage through the corresponding one of the plurality of emergency exit doors.

4. The aircraft of claim 3, wherein the SAM system is configured to display in realtime, from a passenger count of each of the incremental counters, a quantity of passengers remaining on the aircraft on each of the display modules.

5. The aircraft of claim 4, wherein the SAM system is configured to receive, at one of the plurality of display modules, an initial passenger count onboard the aircraft from one of the cabin crew members and to calculate the quantity of passengers remaining onboard the aircraft by subtracting the passenger count received from each of the incremental counters from the initial passenger count.

6. The aircraft of claim 5, wherein each of the plurality of display modules comprises a touchscreen, on which inputs can be received via direct contact with a display screen thereof.

7. The aircraft of claim 4, wherein:
the one or more imaging devices comprise a plurality of imaging devices, each of the plurality of imaging devices being installed at a corresponding one of the plurality of emergency exit doors and oriented such that the images captured by each of the plurality of imaging devices are of an external environment outside of the corresponding one of the plurality of emergency exit doors; and
the one or more display modules comprise a plurality of display modules, each of the plurality of display modules being installed at a corresponding one of the plurality of emergency exit doors and configured such that the images displayed thereon are received from one of the plurality of imaging devices installed at a same one of the plurality of emergency exit doors, so that cabin crew members can determine which of the plurality of emergency exit doors is safe to use for egress of passengers from the aircraft during the emergency evacuation of the aircraft before opening of the emergency exit door associated therewith.

8. The aircraft of claim 7, wherein the incremental counters at the overwing emergency exits are configured for wireless data transmission of the passenger count associated therewith to each of the plurality of display modules.

9. The aircraft of claim 3, wherein the SAM system comprises, at each of the plurality of emergency exit doors, a physical obstruction configured to be deployed to block egress of passengers through the emergency exit door across which such physical obstruction is deployed when a determination has been made that continued use of the emergency exit door for egress of passengers from the aircraft is no longer safe.

10. The aircraft of claim 1, comprising an onboard power source connected to the SAM system and configured to supply power to the SAM system during normal operation, wherein the SAM system comprises a battery backup power system configured to provide power for continued operation of the SAM system upon interruption of power from the onboard power supply.

11. A method of monitoring an emergency evacuation of an aircraft, the method comprising:
providing an aircraft fuselage having a passenger cabin and a cockpit;
providing a center-forward attendant space located between the passenger cabin and the cockpit;
installing a situational awareness monitoring (SAM) system for use in evacuating the passengers from the aircraft during the emergency evacuation, the SAM system comprising:
one or more imaging devices; and
one or more display modules;
positioning a cabin crew member of the aircraft to stand at the center-forward attendant space for monitoring progress of the emergency evacuation;
transmitting images captured by the one or more imaging devices to a corresponding one of the one or more display modules; and
displaying within the passenger cabin the images captured by a corresponding one of the one or more imaging devices on the corresponding one of the one or more display modules.

12. The method of claim 11, wherein the one or more emergency exits comprise a plurality of emergency exit doors at a front and/or rear of the aircraft fuselage and/or a plurality of overwing emergency exits provided within the passenger cabin, in an overwing position.

13. The method of claim 12, wherein the SAM system comprises, for each of the plurality of overwing emergency exits or for pairs of immediately adjacent overwing emergency exits, an incremental counter; and
the method comprising detecting egress of a person from the passenger cabin through the overwing emergency exit or the pair of immediately adjacent overwing emergency exits associated with the incremental counter;

and/or wherein each of the display modules is provided at a corresponding one of the plurality of emergency exit doors and comprises an incremental counter; and the method comprising detecting, using the incremental counter of the display modules, egress of a person from the aircraft fuselage through the corresponding one of the plurality of emergency exit doors.

14. The method of claim 13, comprising displaying in realtime, from a passenger count of each of the incremental counters, a quantity of passengers remaining on the aircraft on each of the display modules.

15. The method of claim 14, comprising:

receiving, at one of the plurality of display modules, an initial passenger count onboard the aircraft from one of the cabin crew members; and calculating the quantity of passengers remaining onboard the aircraft by subtracting the passenger count received from each of the incremental counters from the initial passenger count.

16. The method of claim 15, wherein each of the plurality of display modules comprises a touchscreen, on which inputs can be received via direct contact with a display screen thereof.

17. The method of claim 14, wherein:

the one or more imaging devices comprise a plurality of imaging devices, each of the plurality of imaging devices being installed at a corresponding one of the plurality of emergency exit doors and oriented such that the images captured by each of the plurality of imaging devices are of an external environment outside of the corresponding one of the plurality of emergency exit doors; and the one or more display modules comprise a plurality of display modules, each of the plurality of display modules being installed at a corresponding one of the plurality of emergency exit doors and displaying the images received from one of the plurality of imaging devices installed at a same one of the plurality of emergency exit doors, so that cabin crew members can determine which of the plurality of emergency exit doors is safe to use for egress of passengers from the aircraft during the emergency evacuation of the aircraft before opening of the emergency exit door associated therewith.

18. The method of claim 17, comprising transmitting data of the passenger count associated therewith wirelessly from the incremental counters at the overwing emergency exits to each of the plurality of display modules.

19. The method of claim 13, wherein the SAM system comprises, at each of the plurality of emergency exit doors, a physical obstruction;

the method comprising deploying the physical obstruction to block egress of passengers through the emergency exit door across which such physical obstruction is deployed when a determination has been made that continued use of the emergency exit door for egress of passengers from the aircraft is no longer safe.

20. The method of claim 11, comprising;

connecting an onboard power source to the SAM system and supplying power to the SAM system during normal operation;

providing the SAM system with a battery backup power system; and providing power for continued operation of the SAM system upon interruption of power from the onboard power supply.

21. The method of claim 11, comprising evacuating passengers from the aircraft via one or more emergency exits that are provided from the aircraft during the emergency evacuation.

* * * * *